(12) United States Patent
Minezawa et al.

(10) Patent No.: US 10,778,461 B2
(45) Date of Patent: Sep. 15, 2020

(54) APPLIANCE CONTROL SYSTEM, HOME CONTROLLER, REMOTE CONTROL METHOD, AND RECORDING MEDIUM

(71) Applicant: Mitsubishi Electric Corporation, Tokyo (JP)

(72) Inventors: Satoshi Minezawa, Tokyo (JP); Ichiro Maruyama, Tokyo (JP); Masaaki Yabe, Tokyo (JP); Toshiaki Yoshikawa, Tokyo (JP); Hirotoshi Yano, Tokyo (JP); Daisuke Iizawa, Tokyo (JP); Kenichiro Tanaka, Tokyo (JP); Takashi Ogino, Tokyo (JP); Shinji Nakamura, Tokyo (JP); Masayuki Komatsu, Tokyo (JP); Yuki Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 14/902,074

(22) PCT Filed: Jun. 17, 2014

(86) PCT No.: PCT/JP2014/066059
§ 371 (c)(1),
(2) Date: Dec. 30, 2015

(87) PCT Pub. No.: WO2015/005076
PCT Pub. Date: Jan. 15, 2015

(65) Prior Publication Data
US 2016/0301543 A1  Oct. 13, 2016

(30) Foreign Application Priority Data

Jul. 12, 2013  (JP) .................. 2013-146443

(51) Int. Cl.
*H04L 12/28* (2006.01)
*G08C 17/02* (2006.01)
(Continued)

(52) U.S. Cl.
CPC .......... *H04L 12/2818* (2013.01); *G05B 15/02* (2013.01); *G06F 3/0482* (2013.01);
(Continued)

(58) Field of Classification Search
CPC ... H04L 12/2818; G05B 15/02; G06F 3/0482; G06F 3/04847; G08C 17/02; H04W 4/043; H04W 68/005
(Continued)

(56) References Cited

U.S. PATENT DOCUMENTS 5,859,778 A * 1/1999 Kuroda ................... D06F 33/02
                                              700/169
6,210,273 B1 * 4/2001 Matsuno ................. A63F 13/10
                                              463/31
(Continued)

FOREIGN PATENT DOCUMENTS

JP  H05-242389 A   9/1993
JP  H10-049554 A   2/1998
(Continued)

OTHER PUBLICATIONS

Paul Horowitz, 16 of the Coolest New Features in iOS 5, Jun. 6, 2011, OSXDaily.*
(Continued)

*Primary Examiner* — Robert E Fennema
*Assistant Examiner* — Christopher W Carter
(74) *Attorney, Agent, or Firm* — Posz Law Group, PLC

(57) ABSTRACT

In an appliance control system, a receiver receives, from a terminal device used by a first user, an instruction for remotely controlling an appliance installed in a home. A
(Continued)

determiner determines whether a second user is present in a location in which an appliance-to-be-instructed is installed. When it is determined that the second user is not present in a location in which the appliance-to-be-instructed is installed, an appliance controller controls the appliance on the basis of the instruction. On the other hand, when it is determined that the second user is present in the location in which the appliance-to-be-instructed is installed, the appliance controller does not control the appliance.

14 Claims, 22 Drawing Sheets

(51) Int. Cl.
G05B 15/02 (2006.01)
G06F 3/0482 (2013.01)
G06F 3/0484 (2013.01)
H04W 68/00 (2009.01)

(52) U.S. Cl.
CPC ......... *G06F 3/04847* (2013.01); *G08C 17/02* (2013.01); *H04W 68/005* (2013.01)

(58) Field of Classification Search
USPC ......................................................... 700/275
See application file for complete search history.

(56) References Cited

U.S. PATENT DOCUMENTS

| | | | | |
|---|---|---|---|---|
| 6,756,998 | B1* | 6/2004 | Bilger | H04L 12/2803 715/734 |
| 9,014,076 | B2* | 4/2015 | Weber | H04L 67/24 370/310 |
| 9,599,981 | B2* | 3/2017 | Crabtree | G05B 23/02 |
| 2003/0038730 | A1 | 2/2003 | Imafuku et al. | |
| 2003/0071117 | A1* | 4/2003 | Meade, II | H04N 21/4122 235/382.5 |
| 2005/0169214 | A1* | 8/2005 | Suomela | G08C 17/02 370/331 |
| 2006/0155877 | A1 | 7/2006 | Hashimoto et al. | |
| 2007/0033607 | A1* | 2/2007 | Bryan | H04H 60/27 725/10 |
| 2008/0165144 | A1* | 7/2008 | Forstall | G06F 1/1626 345/173 |
| 2008/0180228 | A1* | 7/2008 | Wakefield | G01S 5/0252 340/4.62 |
| 2008/0273754 | A1* | 11/2008 | Hick | G06K 9/00771 382/103 |

FOREIGN PATENT DOCUMENTS

| | | |
|---|---|---|
| JP | 2003-052093 A | 2/2003 |
| JP | 2004-254163 A | 9/2004 |
| JP | 2005-311967 A | 11/2005 |
| JP | 2007-228100 A | 9/2007 |
| JP | 2008-210337 A | 9/2008 |
| JP | 2010-034957 A | 2/2010 |
| JP | 2012-182520 A | 9/2012 |
| JP | 2012-182655 A | 9/2012 |
| JP | 2013-041332 A | 2/2013 |
| JP | 2013-117690 A | 6/2013 |
| KR | 10-2004-0015802 A | 2/2004 |
| KR | 10-1252688 B1 | 4/2013 |
| WO | 2003/098909 A1 | 11/2003 |

OTHER PUBLICATIONS

Office Action dated Dec. 21, 2016 in the corresponding KR application No. 10-2016-7001192 (partial English translation attached).
Chinese Office Action dated May 3, 2017 issued in corresponding CN Patent No. 1653793 A (partial English translation) and corresponding to WO 2003/098909.
International Search Report of the International Searching Authority dated Jul. 29, 2014 for the corresponding international application No. PCT/JP2014/066059 (and English translation).
Office Action dated Jul. 29, 2014 issued in corresponding JP patent application No. 2013-146443 (and partial English translation).
Extended European Search Report dated Mar. 16, 2017 issued in corresponding EP patent application No. 14822389.4.
Office Action dated Nov. 21, 2019 issued in corresponding EP patent application No. 14822389.4.

* cited by examiner

FIG. 4A

| ROOM IDENTIFICATION NO. | FLOOR NUMBER | ROOM NAME | ROOM SIZE (TATAMI MAT(S)) | ... |
|---|---|---|---|---|
| 101 | 1 | CLOSET | 4 | ... |
| 102 | 1 | STUDY | 6 | ... |
| 103 | 1 | LIVING ROOM | 14 | ... |
| 104 | 1 | CHILDREN'S ROOM | 6 | ... |
| 201 | 2 | JAPANESE-STYLE ROOM | 6 | ... |
| 202 | 2 | BEDROOM | 8 | ... |
| 203 | 2 | BATHROOM | 4 | ... |
| ... | ... | ... | ... | ... |

FIG. 4B

Basic Information Input Screen

Floor Number: 2

Family Structure: [X] Father  [X] Mother  [ ] Son  [ ] Daughter

Floor Plan (1F)

Living Room: 14 Tatami Mat(s)

Study: 6 Tatami Mat(s)

| ROOM IDENTIFICATION NO. | APPLIANCE IDENTIFICATION NO. | APPLIANCE NAME | RATED WATTAGE | ... |
|---|---|---|---|---|
| 102 | 0001 | AIR CONDITIONER | 400W | ... |
| | 0002 | TV | 100W | ... |
| | 0003 | FLOOR HEATING SYSTEM | 120W | ... |
| ... | ... | ... | ... | ... |
| 201 | 0005 | AIR CONDITIONER | 400W | ... |
| | 0006 | TV | 100W | ... |
| | 0007 | FLOOR HEATING SYSTEM | 120W | ... |
| ... | ... | ... | ... | ... |

| ROOM IDENTIFICATION NO | MAIN USER |
|---|---|
| 101 | FATHER, MOTHER, SON, DAUGHTER |
| 102 | FATHER |
| 103 | FATHER, MOTHER, SON, DAUGHTER |
| 201 | SON, DAUGHTER |
| 202 | MOTHER |
| 203 | FATHER, MOTHER |
| 204 | FATHER, MOTHER, SON, DAUGHTER |
| ... | ... |

FIG. 7

| USER | CURRENT LOCATION |
|---|---|
| FATHER | STUDY |
| MOTHER | LIVING ROOM |
| SON | OUTSIDE HOME |
| DAUGHTER | CHILDREN'S ROOM |
| ... | ... |

700

APPLIANCE CONTROL SYSTEM, HOME CONTROLLER, REMOTE CONTROL METHOD, AND RECORDING MEDIUM

CROSS REFERENCE TO RELATED APPLICATIONS

This application is a U.S. national stage of International Patent Application No. PCT/JP2014/066059 filed on Jun. 17, 2014, which claims priority to Japanese Patent Application No. 2013-146443 filed on Jul. 12, 2013, the contents of which are incorporated herein by reference.

TECHNICAL FIELD

The present disclosure relates to an energy management system, a controller, a remote control method and a program.

BACKGROUND ART

There is a system called the Home Energy Management System (HEMS) which connects electrical household appliances to a communication network, and integrally manages the appliances using a controller. In recent years, the HEMS, that can remotely operate an electrical household appliance in a home via the Internet from outside even if a user is not at home, has been known, for example, as in the patent literature 1 below. According to the patent literature 1, the electrical household appliance can be remote controlled. Prior to an execution of a remote control operation, the system asks a user if he/she gives an approval of a remote control operation, and if approved, a remote control operation is executed.

CITATION LIST

Patent Literature

Patent Literature 1: Unexamined Japanese Patent Application Kokai Publication No. 2005-311967.

SUMMARY OF INVENTION

Technical Problem

According to conventional methods, regardless of whether a user is close to an electrical household appliance, other users can remote control the electrical household appliance. Thus, there is a possibility that the electrical household appliance to be controlled may be remotely controlled against the will of the user who is close to the electrical household appliance.

The present disclosure is made under the circumstances mentioned above. An objective of the present disclosure is to provide an energy management system, a controller, a remote control method and a program that maintain the convenience of the remote control operation without affecting user comfort in a home.

Solution to Problem

To achieve the objective mentioned above, an energy management system according to the present disclosure is an energy management system including an appliance and a controller installed in a home, and a terminal device configured to communicate with the controller; wherein the terminal device comprises:

an acceptor configured to accept an instruction for remotely controlling the appliance from a first user; and
a transmitter configured to transmit the instruction accepted by the acceptor to the controller, and wherein the controller comprises:
a receiver configured to receive the instruction from the terminal device;
a determiner configured to determine whether a second user is present in a location in which an appliance-to-be-instructed is installed; and
an appliance controller configured to control the appliance based on the instruction when the determiner determines that the second user is not present in the location in which the appliance-to-be-instructed is installed, and not configured to control the appliance based on the instruction when the determiner determines that the second user is present in the location in which the appliance-to-be-instructed is installed.

Advantageous Effects of Invention

According to the present disclosure, an energy management system, a controller, a remote control method and a program, that maintain the convenience of the remote control operation without affecting user comfort in a home, can be provided.

BRIEF DESCRIPTION OF DRAWINGS

FIG. 2 is a schematic block diagram illustrating an example of an arrangement of rooms of a home and of electrical household appliances and the like;
FIG. 4A is a table showing a configuration example of a layout definition table;
FIG. 4B is a block diagram illustrating a configuration example of a basic information input screen;
FIG. 7 is a table showing a configuration example of a user current location table.

DESCRIPTION OF EMBODIMENTS

Embodiment 1

Figure 1:
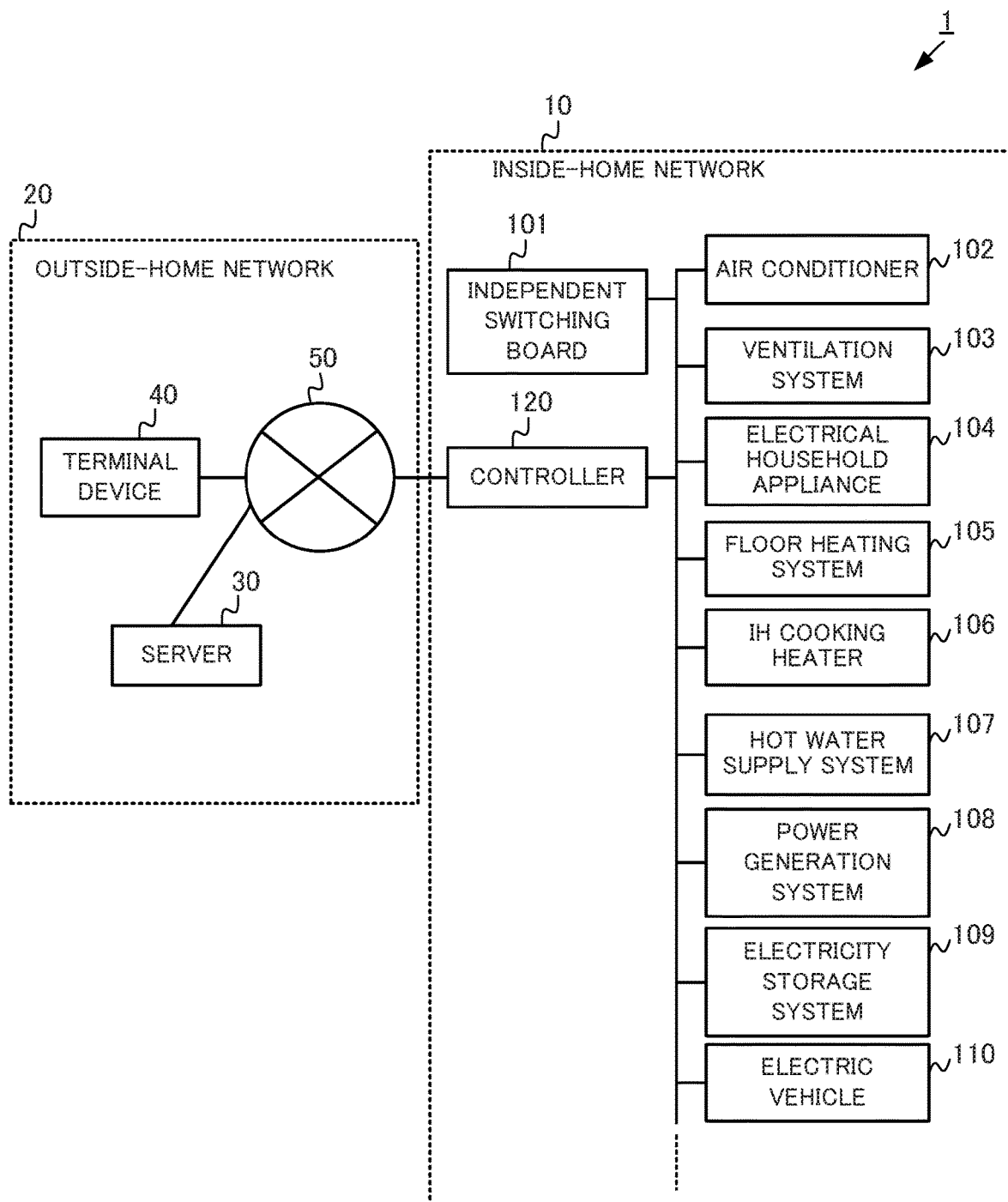
FIG. 1 is a block diagram illustrating a configuration of an energy management system.

FIG. 1 illustrates a configuration of an energy management system 1 according to this embodiment. The energy management system 1 monitors electric power consumed by various appliances and systems installed in a home (in a power consumer), and controls operations of the appliances and systems. For example, an inside-home network 10 includes an independent switching board 101, an air conditioner 102, a ventilation system 103, an electrical household appliance 104 such as a television set, a lighting fixture or the like, a floor heating system 105, an induction heating (IH) cooking heater 106, and a hot water supply system 107.

The inside-home network 10 further includes a power generation system 108 using solar light and the like, an electricity storage system 109 with a storage battery, an electric vehicle 110 having a storage battery that is separable at any time, and a controller 120.

The power lines (not shown) in the home of the energy management system 1 are connected to a commercial power source of an electric power company via the independent switching board 101.

The above-mentioned appliances and systems included in the inside-home network 10 are connected to the power lines in the home, and receive power supplied from at least one of: commercial power source, the power generation system 108, the electricity storage system 109 and the electric vehicle 110.

In addition, these appliances or systems include a wireless communication device (not shown), and are wirelessly communicable with the controller 120. However, a part or all of the communications may be performed via a wire. The appliance or system to be controlled by the energy management system 1 is referred to as "appliance" in the following explanation.

Furthermore, power measuring instruments (not shown) are installed in a plurality of points of the power lines in the home in the energy management system 1, and can sequentially measure power and the like consumed by the air conditioner 102, the ventilation system 103, the electrical household appliance 104, the floor heating system 105, the IH cooking heater 106, the hot water supply system 107, the power generation system 108, the electricity storage system 109, and the electric vehicle 110. The measurement result is transmitted to the controller 120.

The inside-home network 10 is connected to an outside-home network 20 that includes a server 30, a terminal device 40 and a communication network 50. The communication network 50 is typically the Internet. A user can operate each appliance in the inside-inside-home network 10 by a remote-control operation using the terminal device 40 of the outside-home network 20.

The terminal device 40 is accessible to the inside-home network 10 and the outside-home network 20 via wireless communications. For example, the terminal device 40 is a cellular telephone, a personal computer, a tablet type terminal device or the like. A user can carry the terminal device 40 not only in the home but also outside the home, and can remotely operate the energy management system 1 using the terminal device 40.

The energy management system 1 has roughly two types of operation modes. One type of mode is a link mode in which the power lines in the home are connected to a commercial power source via the independent switching board 101, and power is supplied from a commercial power source. In the link mode, power generated by the power generation system 108 can be supplied (can be sold) to a commercial power source.

The other operation mode is an independent operation mode in which the power lines in the home are disconnected from the commercial power source by the independent switching board 101 without power being supplied from the commercial power source, and power generated by the power generation system 108 and/or power saved in the electricity storage system 109 and/or power saved in the electric vehicle 110 is/are supplied in the home.

The operation modes are switched by the independent switching board 101 based on a detection result indicating the supply state of the power from the commercial power source detected by the independent switching board 101. Typically when a commercial power source is interrupted, the independent operation mode is set, whereas the link mode is set when a commercial power source is not interrupted.

Figure 2:
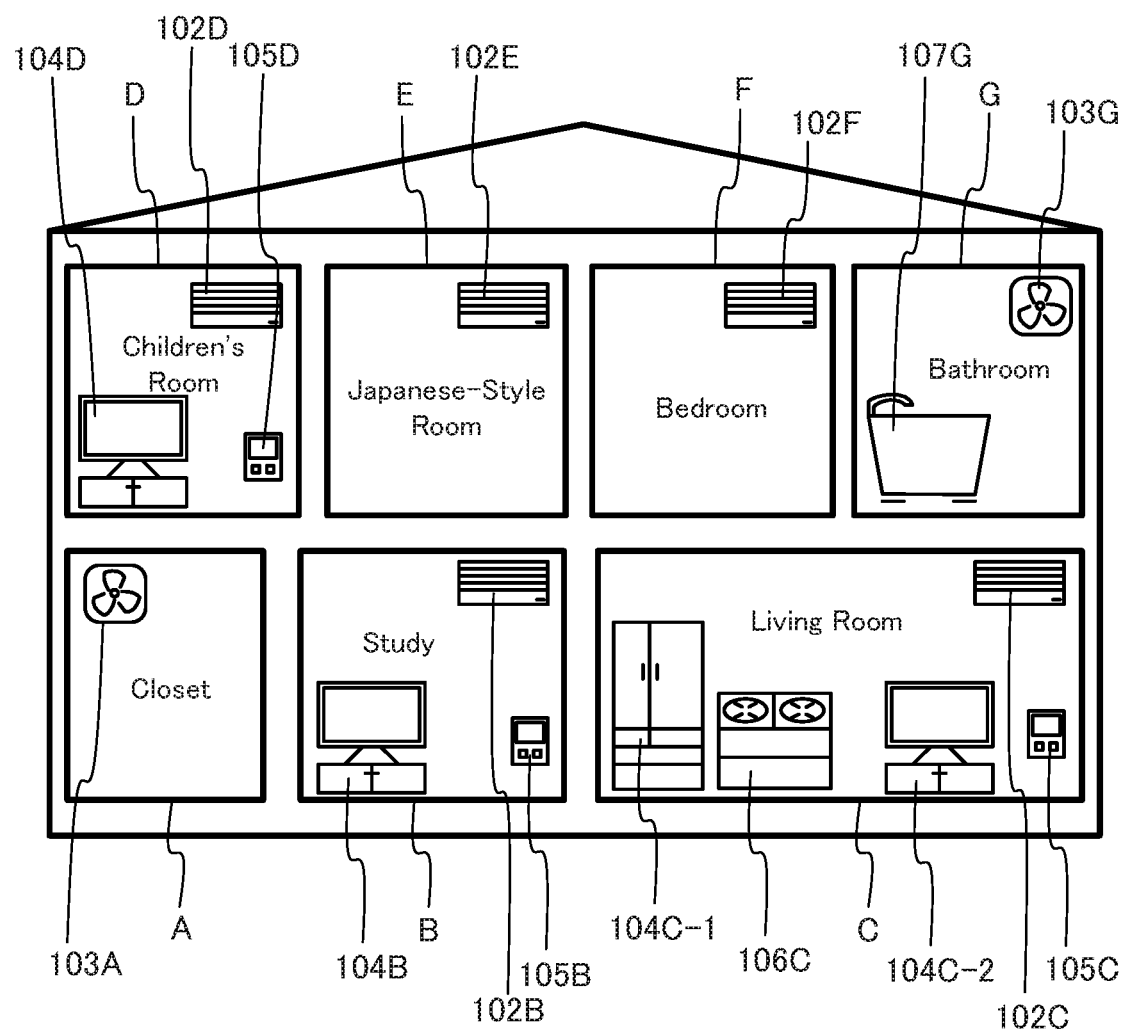

The appliances and system illustrated in FIG. 1 can be installed in an arbitrary location in the home. FIG. 2 shows an example of a layout chart illustrating an arrangement of rooms of a home (floor plan) and an arrangement of the electrical household appliances 104 and the like installed in the home. As illustrated in FIG. 2, there are seven spaces, that is, a closet A, a study B, a living room C, a children's room D, a Japanese-style room E, a bedroom F, a bathroom G in the home of this embodiment. Various appliances and systems that can be controlled by the controller 120 are installed in each space.

For example, a ventilation system 103A is installed in the closet A.

For example, in the study B, an air conditioner 102B, an electrical household appliance 104B (television set), and a floor heating system 105B are installed.

For example, in the living room C, an air conditioner 102C, an electrical household appliance 104C-1 (refrigerator), an electrical household appliance 104C-2 (television set), a floor heating system 105C, and an IH cooking heater (IHCH) 106C are installed.

For example, in the children's room D, an air conditioner 102D, an electrical household appliance 104D (television set), and a floor heating system 105D are installed.

For example, in the Japanese-style room E, an air conditioner 102E is installed.

For example, in the bedroom F, an air conditioner 102F is installed.

For example, in the bathroom G, a ventilation system 103G, and a hot water supply system 107G are installed.

Each appliance noted in each room A to G communicates with the controller 120, and the controller 120 can control the operations of the appliances.

In FIG. 2, the types of appliances installed in each room, the number of appliances, the installation locations of the appliances are shown only as an example, and are not limited by the present disclosure.

Figure 3:
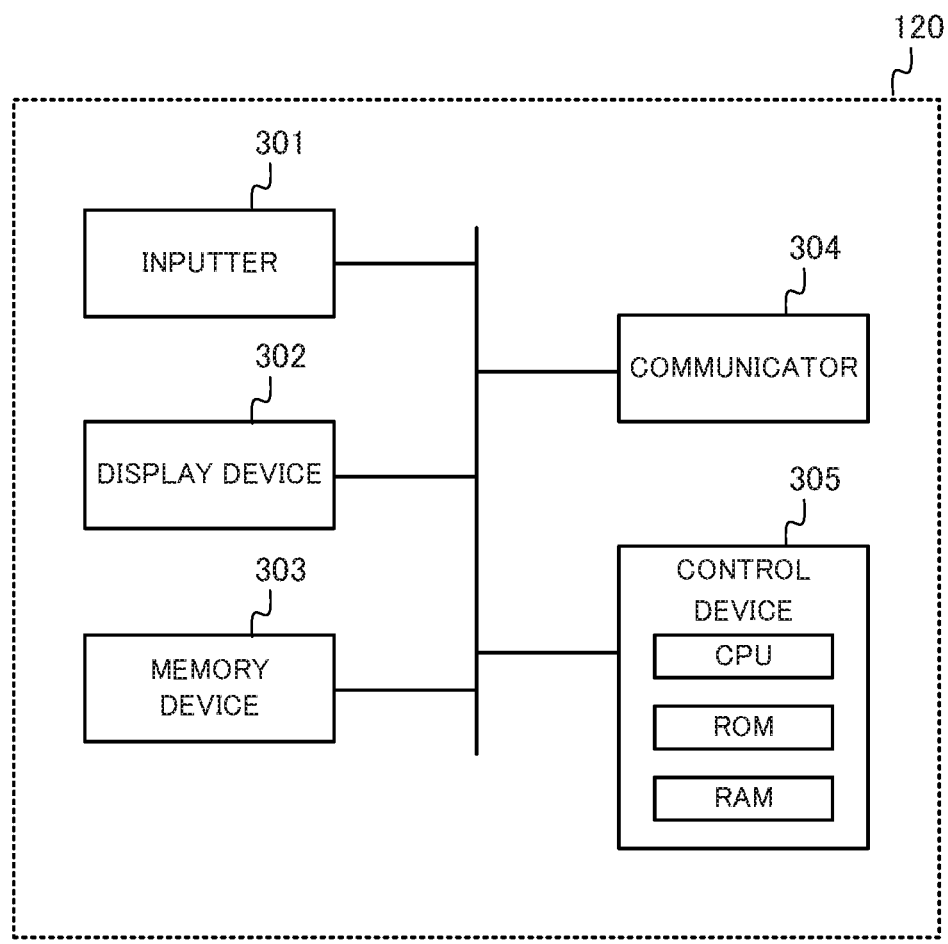
FIG. 3 is a block diagram illustrating a configuration of a controller.

Next, the configuration of the controller 120 is described with reference particularly to FIG. 3. The controller 120 monitors and controls the entire energy management system 1.

An inputter 301 includes an input device such as a button, a keyboard, a touch panel and the like. The inputter 301 accepts an instruction input from a user.

A display device 302 includes a display such as a liquid crystal display and the like.

A memory device 303 includes a nonvolatile memory. The memory device 303 stores, in addition to a program executed by a control device 305, a layout definition table 400 defining the layout of the rooms of the home illustrated in FIG. 4A, an appliance-room correspondence table 500 defining the installation locations (rooms) in the home in association with the appliance to be controlled by the controller 120 illustrated in FIG. 5A, a room-user correspondence table 600 defining a room-user correspondence illustrated in FIG. 6A, and a user current location table 700 illustrated in FIG. 7. The details are mentioned below.

A communicator 304 includes a Network Interface Card (NIC) and wirelessly communicates with the appliances in the energy management system 1.

A control device 305 includes a Central Processing Unit (CPU), a Read Only Memory (ROM) that stores a program such as an operating system, a Random Access Memory (RAM) that functions as a working area, and the like. The control device 305 executes a program stored in the memory device 303 and controls the entire controller 120.

For example, the control device 305 detects a user state to indicate whether the user is in the home, stores a detection result onto the memory device 303 and updates appropriately.

As a controller 120, a general server, a mainframe, a personal computer and the like can be adopted.

In addition, the terminal device 40 in this embodiment includes hardware configurations equivalent to the inputter 301, the display device 302, the memory device 303, the communicator 304 and the control device 305 that are included in the controller 120. Detailed explanation is omitted.

FIG. 4A shows a configuration example of a layout definition table 400 stored in the memory device 303 in the energy management system 1 installed in a two-story single-family home. Room identification numbers, floor numbers of the room, names of the room and room sizes are associated and stored in the layout definition table 400. The control device 305 can appropriately change the layout definition table 400 based on an input from the user.

FIG. 4B shows a configuration example of a screen accepting an input of basic information from the user in the energy management system 1. This screen is displayed on a liquid crystal display, for example, at the time of setup of the energy management system 1. The user inputs his/her basic information such as the floor plan of the home or his/her family make-up using this screen. The control device 305 makes or updates the layout definition table 400 based on the input content from the user.

Figures 5A, 5B:
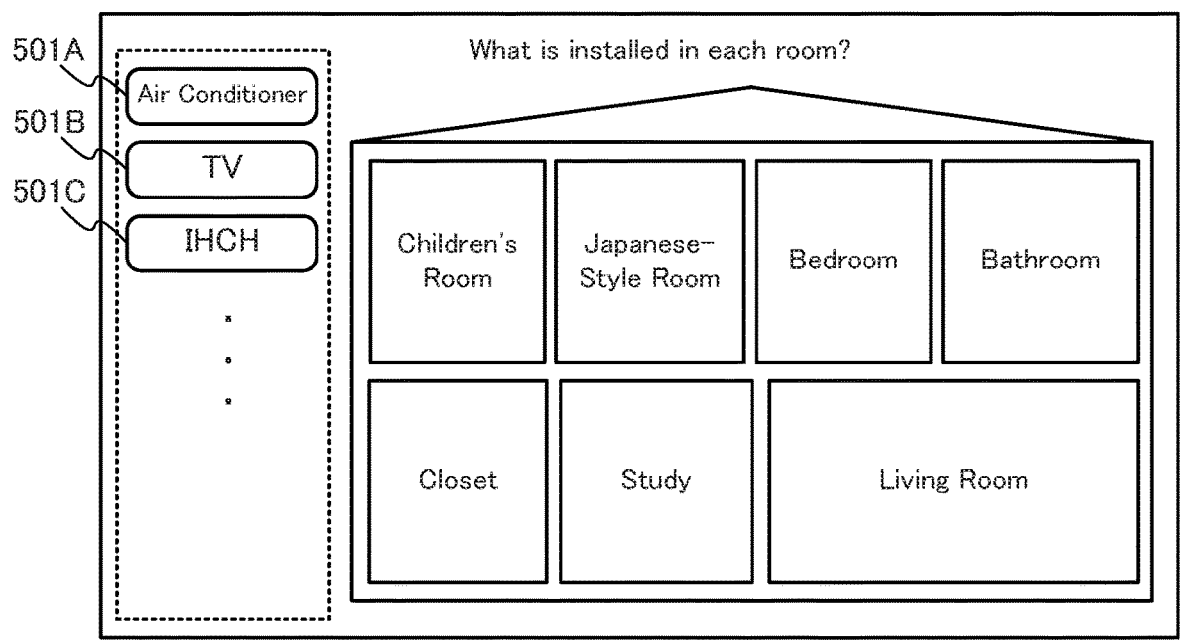
FIG. 5A is a table showing a configuration example of an appliance-room correspondence table.
FIG. 5B is a schematic diagram illustrating a configuration example of a screen for inputting a room-appliance correspondence.

FIG. 5A shows a configuration example of an appliance-room correspondence table 500. Associated with the identification number of the room, the identification number of the appliance installed in the room and the name of the appliance are stored in the appliance-room correspondence table 500. Characteristic values such as power rating of the appliance may be further stored in the appliance-room correspondence table 500.

For example, when a user newly purchases an appliance and installs it in a room, the user operates the controller 120 and displays a screen for editing the appliance-room correspondence table 500, and inputs the names and the like of the appliances and the rooms in which the appliances are installed. The control device 305 changes the appliance-room correspondence table 500 based on the input from the user appropriately.

FIG. 5B illustrates a configuration example of a screen for accepting an input of a room-appliance correspondence from a user. The user drags and moves icons 501, (three icons in FIG. 5B: 501A, 501B, and 501C) indicating the appliance, into a frame indicating the room in which the appliance is installed. The control device 305 generates or updates the appliance-room correspondence table 500 based on the input content from the user using this editing screen.

The controller 120 may obtain information from a certain server of the outside-home network 20 and may update the appliance-room correspondence table 500. The controller 120 accepts inputs of the model number and/or serial number of the appliance from the user and transmits the model number and/or serial number to the server. The server may obtain, from a database, characteristic values such as the power rating of the appliance corresponding to the model number and/or the serial number, and transmit them to the controller 120, and the controller 120 may update the appliance-room correspondence table 500 using the characteristic value which the controller 120 obtains from a server.

The control device 305 can make an schematic drawing of the whole building as shown in FIG. 2 based on the layout definition table 400, the appliance-room correspondence table 500 and template image data illustrating an appearance of the building and the appliance, and can display the schematic drawing on a display. The schematic drawing does not need to be an exact drawing that faithfully reproduces reality as long as the user can visually recognize the rooms in which the appliance or system is installed.

For example, when the user drags the icon 501A indicating an air conditioner on an editing screen illustrated in FIG. 5B, the control device 305 places an image indicating the air conditioner in a display area of the living room. The image indicating the appliance may not be an image that faithfully reproduces the appearance of the appliance actually installed by the user. In addition, a position to place the image may not be a position that faithfully reproduces the appearance of the appliance actually installed by the user. In addition, the present disclosure does not limit a method in which the control device 305 makes the image data indicating the schematic drawing.

Figures 6A, 6B:
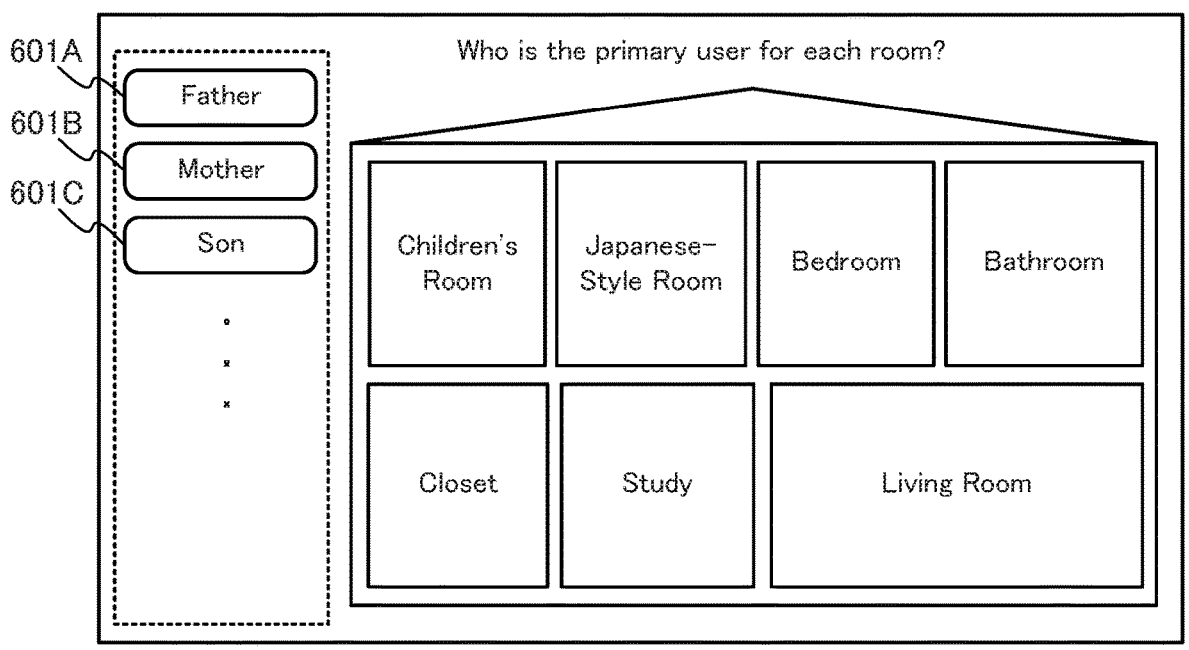
FIG. 6A is a table showing a configuration example of a room-user correspondence table.
FIG. 6B is a schematic diagram illustrating a configuration example of a screen for inputting a room-user correspondence.

FIG. 6A shows a configuration example of the room-user correspondence table 600. Information indicating a user who mainly uses a room and the room associated with the identification number of the room is stored in the room-user correspondence table 600. For example, four people, namely, a father, a mother, a son, and a daughter are associated with the living room of an identification number "103".

FIG. 6B shows a configuration example of a screen accepting an input of a room-user correspondence from the user. The user drags and moves an icon 601, (three icons in FIG. 6B: 601A, 601B, and 601C) indicating the user, into a frame indicating the room in which the appliance is installed, and the user who mainly uses the room is designated. The control device 305 generates or updates the room-user correspondence table 600 based on the input content from the user using this screen.

A combination of the appliance-room correspondence table 500 and the room-user correspondence table 600 provides an appliance-user corresponding relationship, as the identification number of the room serves as a common key.

For example, according to the appliance-room correspondence table 500 shown in FIG. 5A, the study having an identification number "102" is associated with the air conditioner 102B having an identification number "0001", the electrical household appliance 104B (television set) having an identification number "0002" and the floor heating system 105B having an identification number "0003". In addition, according to the room-user correspondence table 600 shown in FIG. 6A, "Father" is associated with the study having an identification number "102". Therefore, the control device 305 determines that three of the air conditioner 102B having an identification number "0001", the electrical household appliance 104B having an identification number "0002", and the floor heating system 105B having an identification number "0003" are associated with "Father". Similarly, the control device 305 can determine users that can be associated for all appliances.

FIG. 7 shows a configuration example of a user current location table 700. The identification information indicating the user and the data indicating the current location of the user are associated with each other and are stored in the user current location table 700. The control device 305 of the controller 120 periodically determines a current position of the user and updates the user current location table 700 at any time.

There are various methods in which the controller 120 determines a current position of the user. For example, an access point of a home wireless LAN is installed in each room, and each user carries a mobile terminal such as a tablet type computer for the user's exclusive use. Generally, the mobile terminal compatible with the wireless LAN connects to an access point having the strongest electric wave. An access point having the strongest electric wave is the closest access point. Therefore the control device 305 of the controller 120 identifies a room in which the access point to which the mobile terminal is connected is provided, and determines that the user associated with the identified mobile terminal is in the room with the access point. The control device 305 then updates the user current location table 700.

The control device 305 may determine a current position of the user using an identification (ID) tag or an integrated circuit (IC) card that the user possesses. For example, an infrared communication interface is provided on the appliance and the like in each room or on a wall in each room. Each appliance and the like performs an infrared communication communicable in a relatively short distance with the ID tag or the IC card via the infrared interface. The control device 305 identifies the appliance and the like communicating with the ID tag or an IC card, and determines that the user associated with the ID tag or the IC card is in the room in which the identified appliance and the like is installed. The control device 305 then updates the user current location table 700.

The control device 305 may determine the user and the location of the user using image recognition. For example, a camera that can communicate with the controller 120 is installed in each room. The control device 305 analyzes an image imaged by the camera, and if somebody is imaged in the image, that user is identified. The control device 305 determines that the identified user is present in the room in which the camera that imaged the image is installed. Then, the control device 305 then updates the user current location table 700.

The control device 305 may determine a current position of the user based on an input from the user. For example, an input device is installed in each room, and the user presses the button associated with the user when entering the room. The control device 305 determines that the user associated with the pressed button is present in the room in which the button is pressed.

In addition, when the control device 305 determines that the user is not present in any of the rooms in the home, the control device 305 sets a value indicating that the user is outside the home into the user current location table 700.

Figure 8:
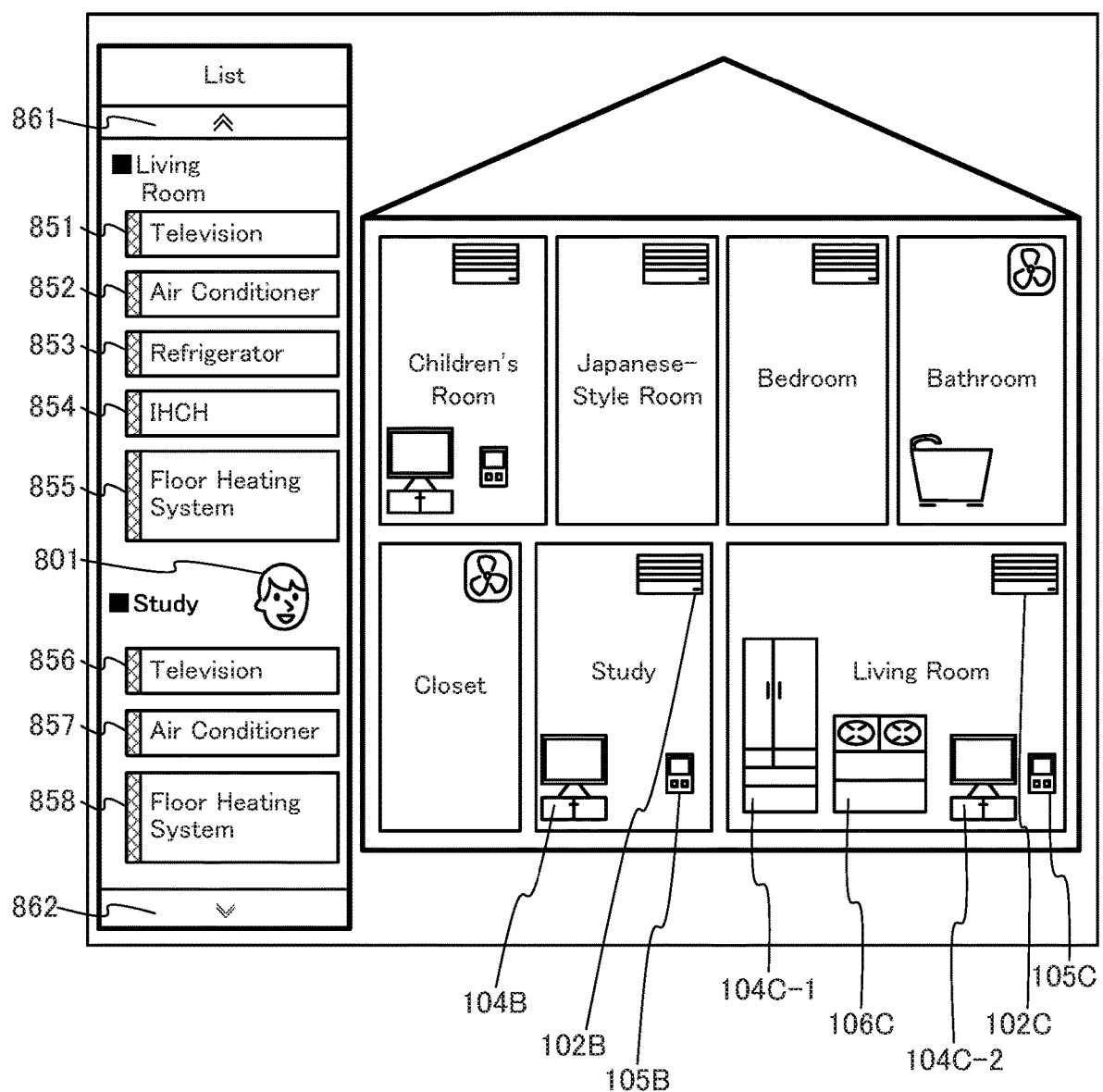
FIG. 8 is a schematic diagram illustrating a configuration example of a management screen.

Next, FIG. 8 illustrates a configuration example of a management screen of the energy management system 1 displayed by the controller 120 or the terminal device 40. This management screen is displayed on a display included in the controller 120, on a display connected to the controller 120, or on a display included in the terminal device 40 that can remotely operate the energy management system 1.

The management screen includes a list of installed appliances and the layout chart illustrated in FIG. 2. Display areas of names of the appliances in the list form software buttons, and the user can select an appliance and the like by pressing the software button. Images indicating the appliances and the like displayed in the layout chart are associated one to one with each of the appliance and the like included in the list.

For example, in the living room, a button 851 in the list is associated with the electrical household appliance 104C-2 (television set). Button 852 is associated with the air conditioner 102C. Button 853 is associated with the electrical household appliance 104C-1 (refrigerator). Button 854 is associated with the IH cooking heater 106C. Button 855 is associated with the floor heating system 105C. In addition, in the study, button 856 is associated with the electrical household appliance 104B (television set). Button 857 is associated with the air conditioner 102B. Button 858 is associated with the floor heating system 105B.

Although not shown, the list includes buttons corresponding to appliances and the like installed in the closet, the children's room, the Japanese-style room, the bedroom, and the bathroom. When the buttons 861 and 862 are pressed, the list is displayed scrolling in up and down directions. Buttons, corresponding to appliances and the like installed that can be controlled by the energy management system 1, are set in the list.

Figure 9:
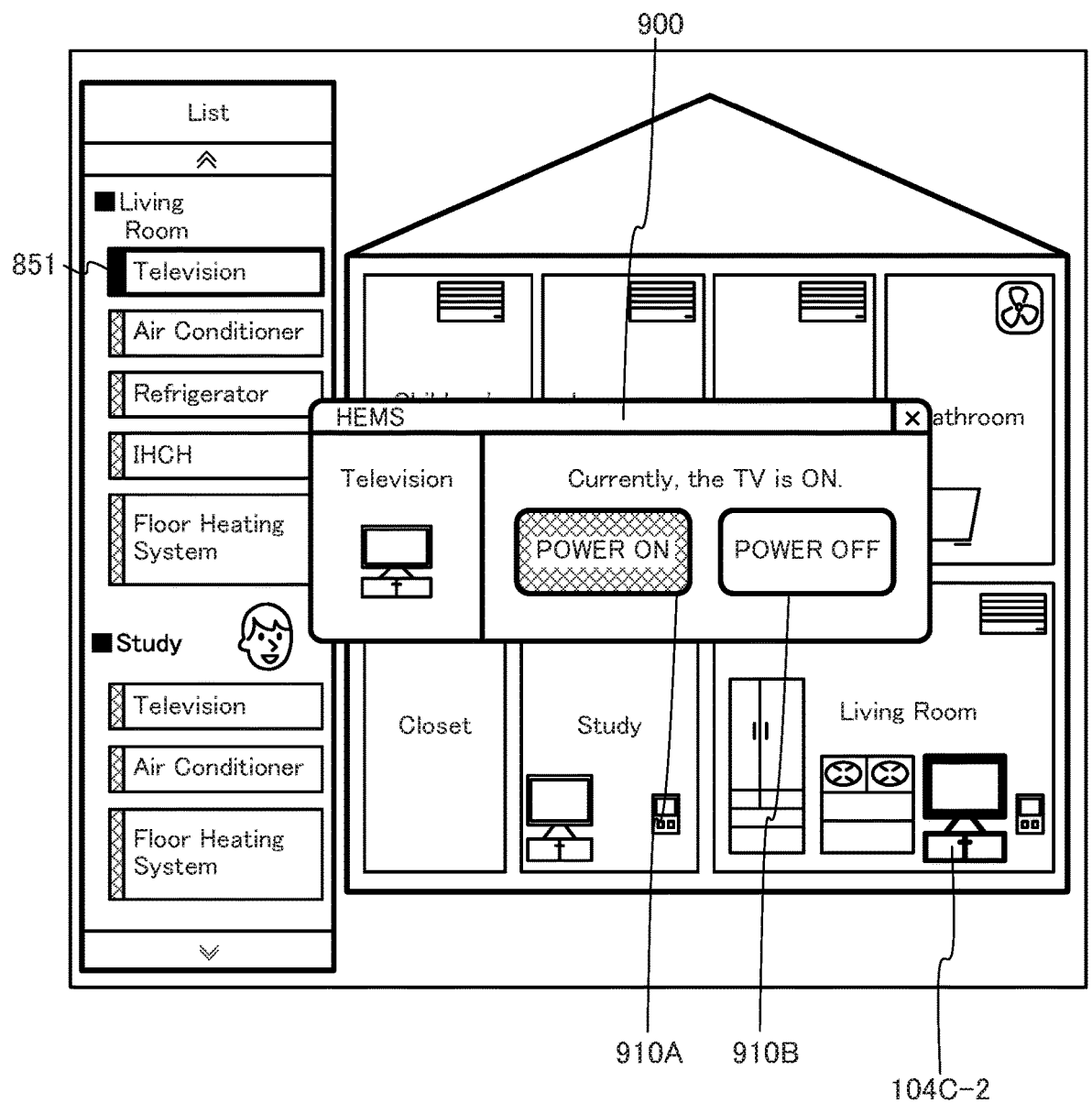
FIG. 9 is a schematic diagram illustrating a dialog box to accept an instruction.

When the button 851 is pressed by the user, the control device 305 selects the electrical household appliance 104C-2 associating with the button 851 and highlights an image indicating the selected electrical household appliance 104C-2. In addition, as illustrated in FIG. 9, the control device 305 displays a dialog box 900 to accept an instruction to the electrical household appliance 104C-2 when the button 851 is further pressed in a state in which the image indicating the electrical household appliance 104C-2 is highlighted.

When the button 851 is pressed only once, the control device 305 may highlight the image indicating the electrical household appliance 104C-2 and may set to display the dialog box 900 when the button 851 is pressed twice in a row in a short time.

The dialog box 900 includes information indicating a current state of the electrical household appliance 104C-2, and buttons 910 (910A and 910B in FIG. 9) associated with the instruction content to the electrical household appliance 104C-2. When the button 910B is pressed, the control device 305 determines that an instruction to turn off the power source of the electrical household appliance 104C-2 is input, and turns off the power source of the electrical household appliance 104C-2. In the case of FIG. 9, as the power source of the electrical household appliance 104C-2 is already turned on, the user cannot press the button 910A associated with the instruction to turn the power source on.

The display contents in the dialog box 900 are differentiated for every controlling object. For example, in the case of an air conditioner, the control device 305 displays, in addition to the power source ON/OFF buttons, a text box to change setting temperatures and a button to switch between heating, cooling, dehumidification, and ventilation. In addition, the control device 305 may display a current target temperature, and/or continuously operated time.

When an instruction to close the dialog box 900 is input without any button in the dialog box 900 being pressed, the control device 305 deletes the dialog box 900 and the highlighted image is turned back to a normal display.

In addition, there are some variations in a highlighting method: magnification, blinking, change of color, and providing a mark indicating that the display is selected.

In addition, when the image indicating the electrical household appliance 104C-2 is selected by the user, the control device 305 highlights the button 851 in the list. When the button 851 is further pressed in a state in which the image indicating the electrical household appliance 104C-2 is highlighted, the control device 306 displays the dialog box 900. In this way, the display of the list is linked together with the display of the layout chart. When the user wants to input an instruction into the electrical household appliance 104C-2, the user may press the button corresponding to the electrical household appliance 104C-2 in the list, or may press the image corresponding to the electrical household appliance 104C-2 in the layout chart.

As an example, operations of the electrical household appliance 104C-2 are explained. This, of course, similarly applies to other appliances.

Furthermore, an icon 801 indicating a current location of the user is displayed on the management screen shown in FIG. 8. The control device 305 displays the icon 801 indicating a current location of the user in the list based on the user current location table 700 indicating the determination result of the current position of the user for each user registered in the basic information.

For example, when the control device 305 determines that a current location of the user, "Father" is the "study", the control device 305 places the icon 801 indicating "Father" in the location corresponding to "the study" in the list. In this way, the user (for example, the mother who viewed the management screen from outside) who viewed the management screen using the terminal device 40 can confirm the father's current location at first sight.

Figure 10:
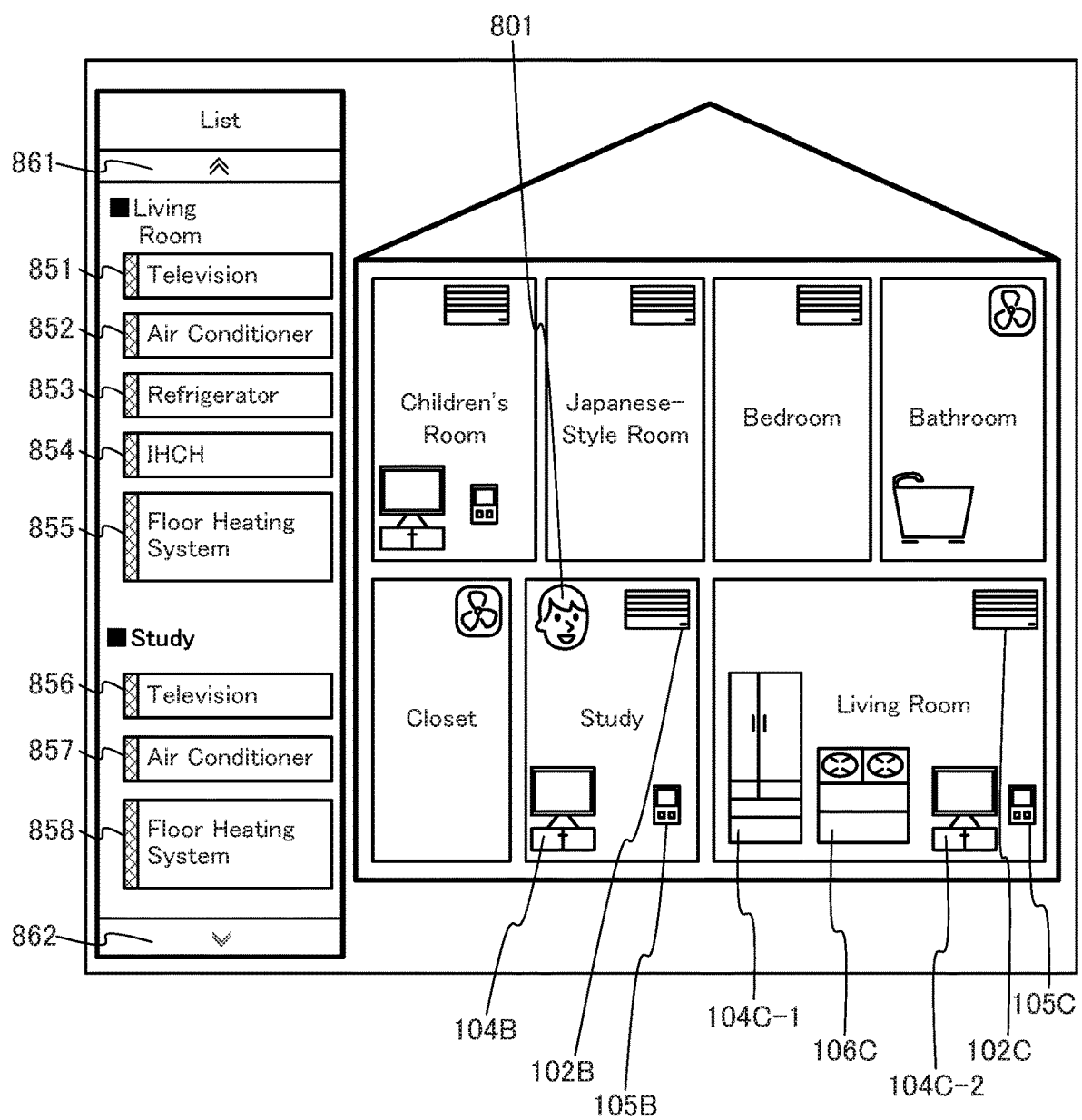
FIG. 10 is a schematic diagram illustrating a configuration example of a management screen.

As illustrated in FIG. 10, the control device 305 may display the icon 801 in the display area of the corresponding room in the layout chart, in addition to displaying the icon 801 in the list, or instead of displaying the icon 801 in the list.

The shape, size, color, design, and number of the icon 801 are freely selectable. The image data indicating the icon 801 may be pre-stored in a memory device 303 or the user may optionally make the image data.

When the control device 305 determines that a certain user is not in the home (is outside the home), the control device 305 displays the icon indicating the user neither in the list nor in the layout chart.

Figure 11:
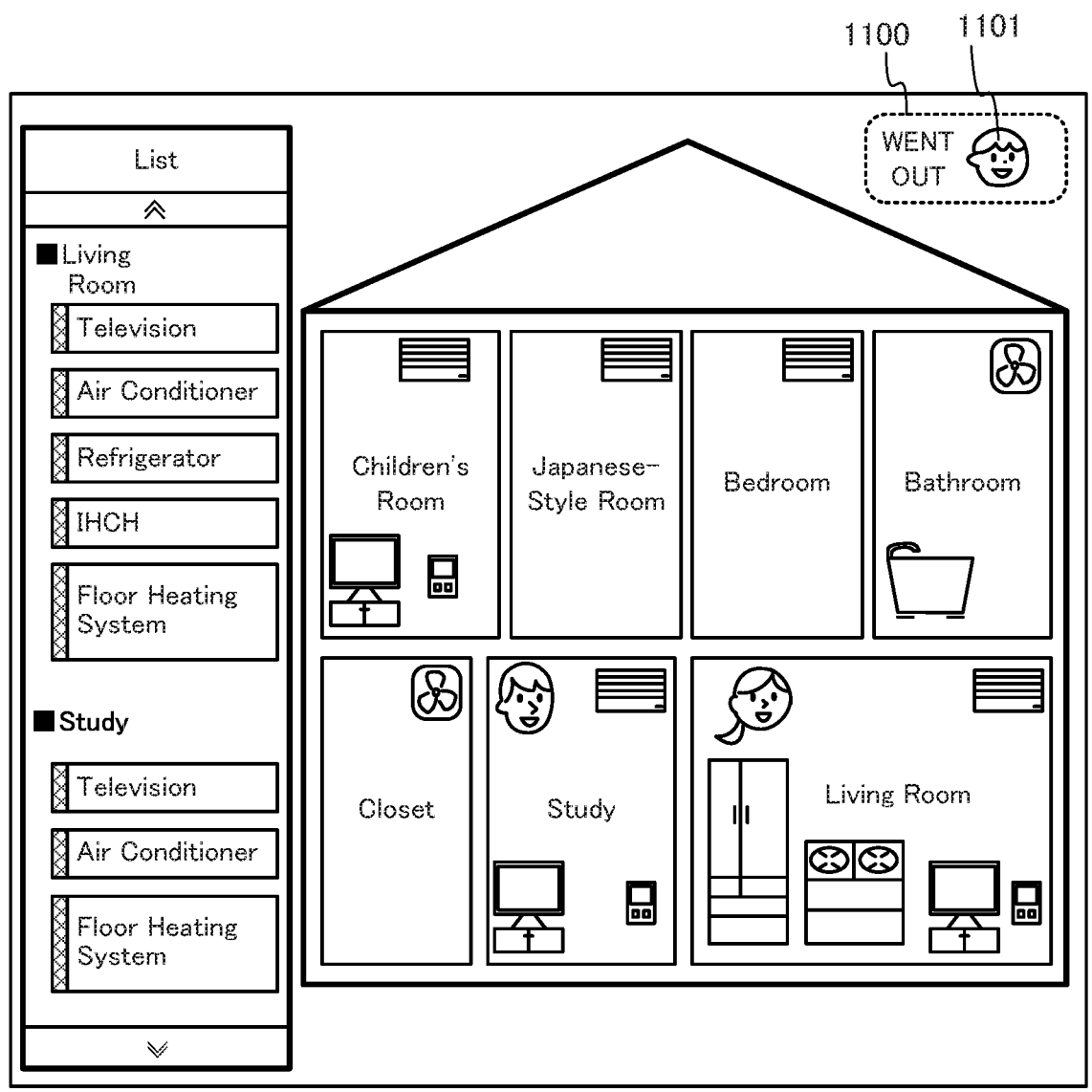
FIG. 11 is a schematic diagram illustrating a configuration example of a management screen.

Or, as illustrated in FIG. 11, the control device 305 may display an icon 1101 indicating that the user is not in the home in a frame 1100 representing outside the home.

By the way, in this embodiment, the user who remotely operates using the terminal device 40 cannot provide an instruction to operate all appliances and the like unconditionally. In this embodiment, the energy management system 1 is set not to accept a remote control operation regarding the appliance and the like placed in the room in which there is a user.

Figure 12:
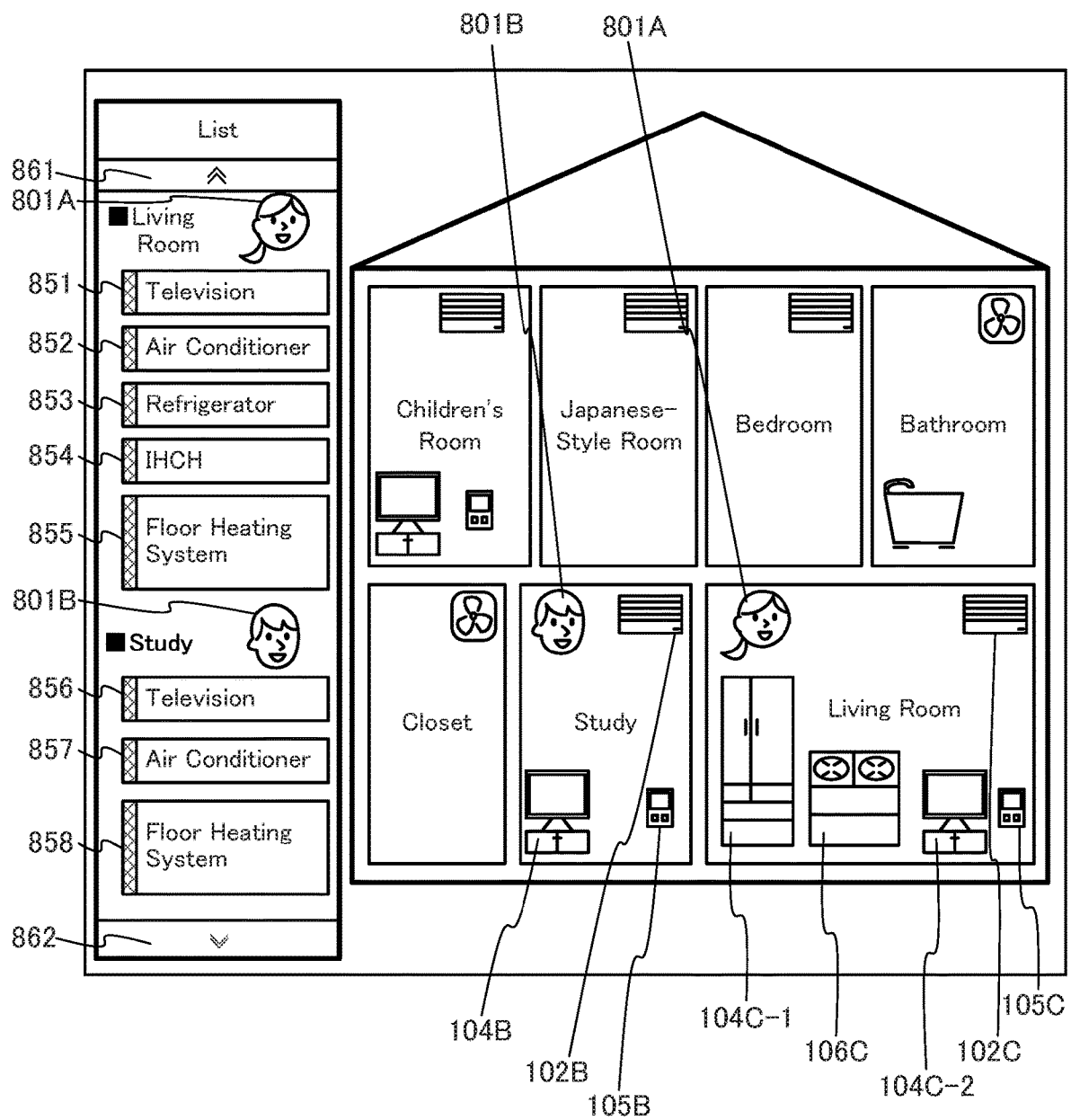
FIG. 12 is a schematic diagram illustrating a configuration example of a management screen.

For example, in a management screen illustrated in FIG. 12, the icon 801A indicating "Mother" is displayed in the living room in the list, and the icon 801B indicating "Father" is displayed in the study. In other words, the mother is in the living room, and the father is in the study. In this case, a user (for example, a son) who is outside the home is presumed to use the terminal device 40 and presumed to try to remotely operate an appliance. The management screen illustrated in FIG. 12 is displayed on the terminal device 40. When an image indicating the electrical household appliance 104C-2 is selected, the terminal device 40 notifies the controller 120 that the electrical household appliance 104C-2 is selected as an object to be operated. The control device 305 of the controller 120 refers to the user current location table 700 and determines whether a user is in the room (living room) in which the selected electrical household appliance 104C-2 is placed.

Figure 13:
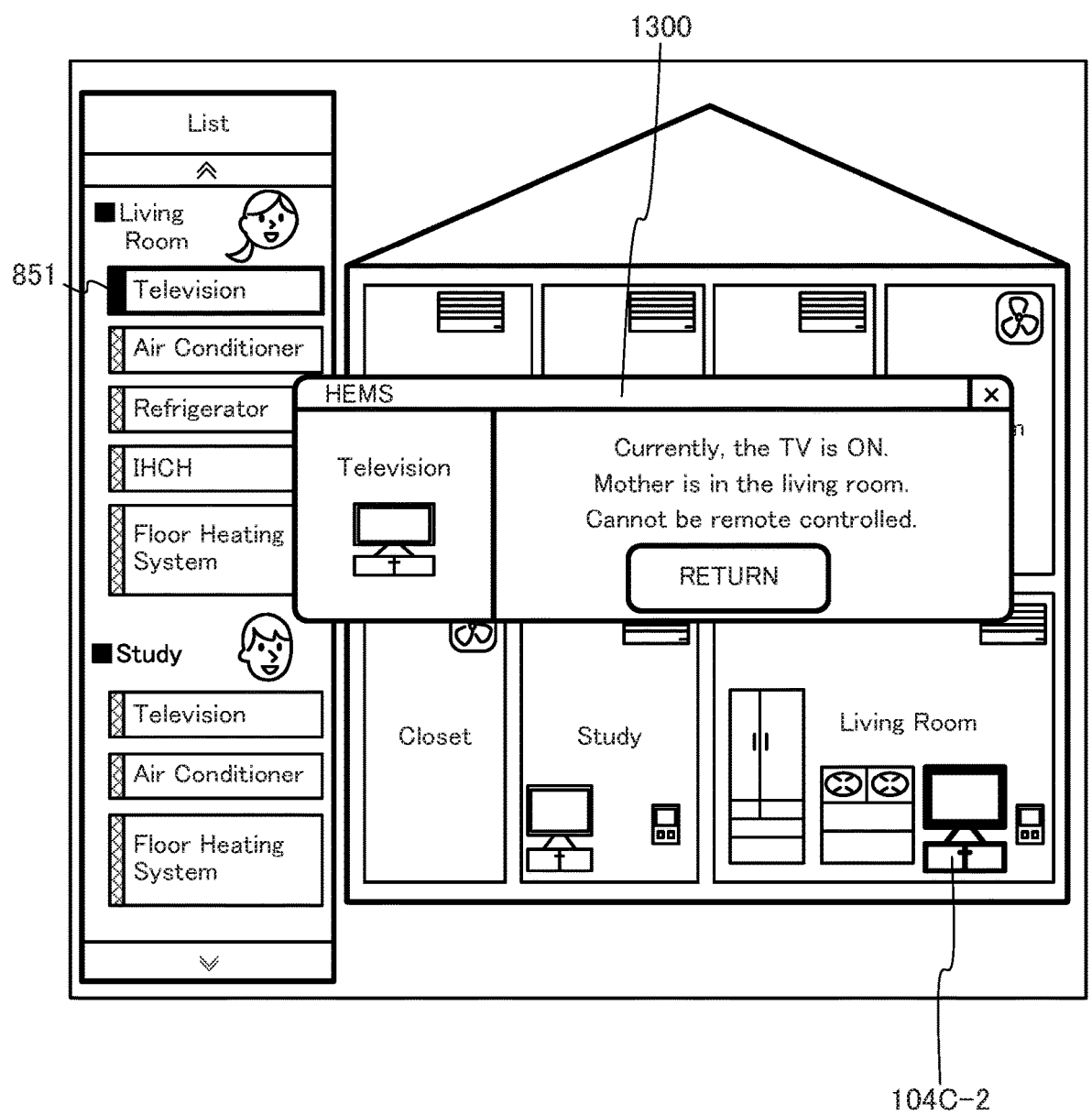
FIG. 13 is a schematic diagram illustrating a dialog box in which a remote control operation is not accepted.

When the control device 305 of the controller 120 determines that the user (the mother) is in the room (living room) in which the selected electrical household appliance 104C-2 is placed, the control device 305 of the controller 120 does not accept the remote operation of the electrical household appliance 104C-2 and notifies the terminal device 40 that the electrical household appliance 104C-2 cannot be remote controlled. As illustrated in FIG. 13, the notified terminal device 40 displays a dialog box 1300 indicating that the electrical household appliance 104C-2 cannot be remote controlled. Therefore, the electrical household appliance 104C-2 is never remote controlled against the will of the user in the room in which the electrical household appliance 104C-2 is placed. For example, after the user in the room willingly starts a cooling operation of the electrical household appliance 104C-2, there is no risk of the cooling operation being stopped or a set temperature being changed remotely against the will of the user in the room by another user who is not in the room.

In addition, when the control device 305 of the controller 120 determines that nobody is in the room in which the selected electrical household appliance 104C-2 is placed, the control device 305 of the controller 120 determines that remote control of the electrical household appliance 104C-2 is allowable and notifies the terminal device 40 of operating conditions and the like of the electrical household appliance 104C-2. As illustrated in FIG. 9, the notified terminal device 40 displays the dialog box 900 to accept the remote control operation of the electrical household appliance 104C-2.

As an example, operations of the electrical household appliance 104C-2 are explained. This, of course, similarly applies to other appliances. The user of the terminal device 40 cannot remote control any appliance in a room in which another user is present.

In this embodiment, the energy management system 1 does not accept a remote control operation of an appliance placed in a room in which a user is present. However, the user in the room can directly operate the appliance and instruct to function without using a remote control.

Figure 22:
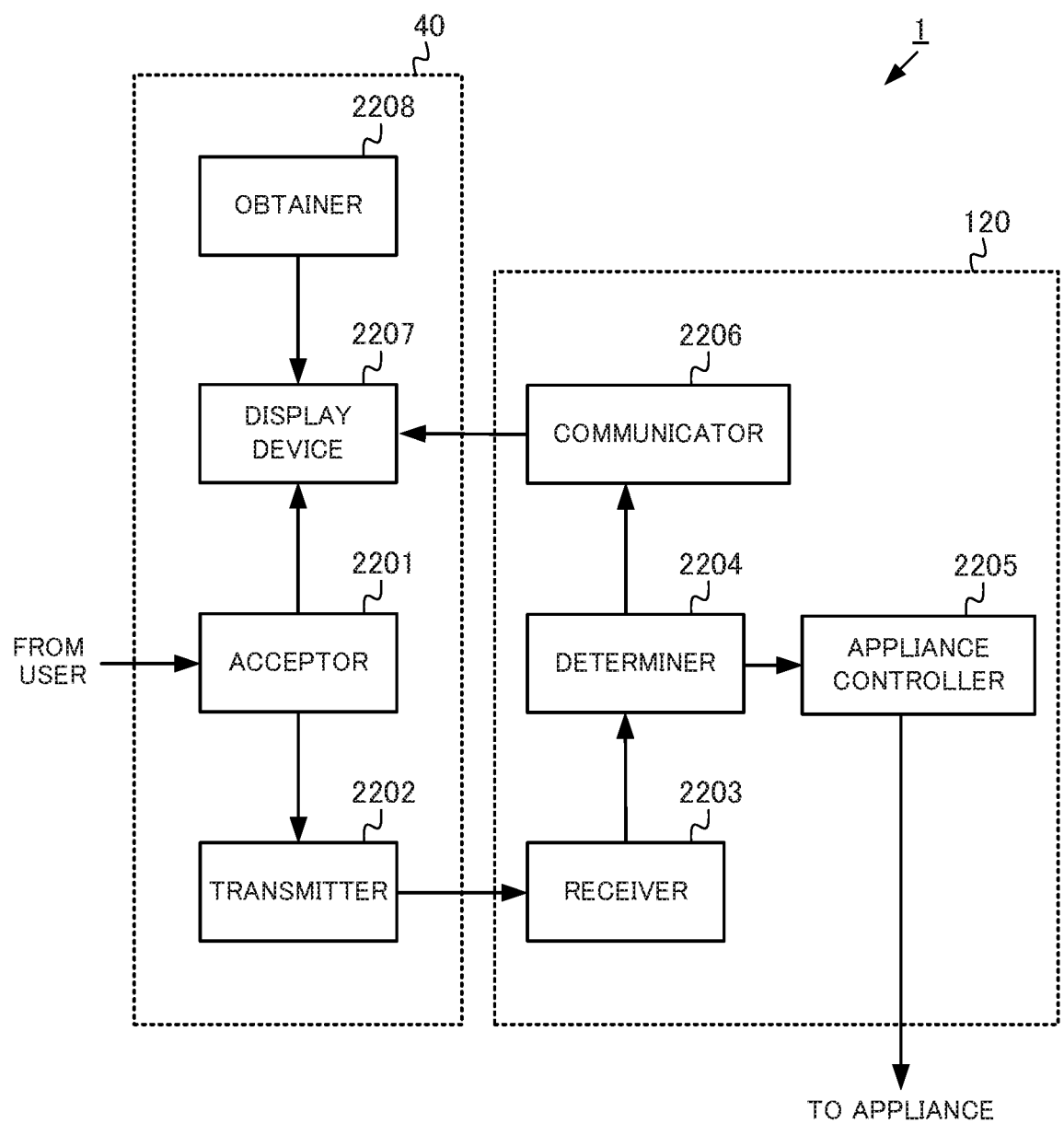
FIG. 22 is a block diagram illustrating a functional configuration of an energy management system.

Next, a functional configuration of the energy management system 1 in this embodiment is explained using FIG. 22.

An acceptor 2201 accepts from a first user an instruction to remote control an appliance. Typically, the first user inputs the instruction to remote control the appliance in the home using the terminal device 40 when outside the home. The first user may input an instruction to remotely operate an appliance in another room from a certain room in the home. An inputter and a control device of the terminal device 40 collaborate and function as the acceptor 2201.

A transmitter 2202 transmits the instruction accepted by the acceptor 2201 to the controller 120. A communicator and the control device of the terminal device 40 collaborate and function as the transmitter 2202.

A receiver 2203 receives the instruction accepted by the acceptor 2201 from the terminal device 40. The communicator 304 and the control device 305 of the controller 120 collaborate and function as the receiver 2203.

A determiner 2204 determines whether a second user is in a location in which the accepted appliance-to-be-instructed is installed. The second user is a user except the first user who instructed the remote operation among all users registered in the basic information. In addition, the determiner 2204 determines a current location of the second user. The control device 305 of the controller 120 functions as the determiner 2204.

When the second user is determined not to be in the location in which the appliance-to-be-instructed from the first user is installed, an appliance controller 2205 controls the appliance based on the instruction. On the other hand, the appliance controller 2205 does not control the appliance based on the instruction when the second user is determined to be in the location in which the appliance-to-be-instructed is installed. The control device 305 of the controller 120 functions as the appliance controller 2205.

When the second user is determined to be in the location in which the appliance-to-be-instructed from the first user is installed, the notifier 2206 notifies the terminal device 40 that the appliance cannot be remote controlled based on the instruction. The control device 305 and the communicator 304 of the controller 120 collaborate and function as the notifier 2206.

A display device 2207 displays a list of appliances installed in the home and/or the layout chart indicating the installation location of the appliance in the home. The display device and the control device of the terminal device 40 collaborate and function as the display device 2207.

Typically a software button corresponding to an appliance is placed in a list to be displayed. The first user can select an appliance by operating the software button. The acceptor 2201 accepts from the first user an instruction to select the appliance corresponding to the operated software button among the software buttons included in the list.

In addition, an image indicating the appliance is placed in the displayed layout chart. The first user can select the appliance by operating the image. When the image is operated by the first user, the display device 2207 highlights the image indicating the operated appliance. The acceptor 2201 accepts an instruction from the user to select one of the appliances from among the images indicating the appliances included in the layout chart.

The information indicating the current location of each user registered in the basic information may be included in the list to be displayed.

The obtainer 2208 obtains the information indicating the current location of the second user from the controller 120. The selected 2207 displays an image indicating the second user in the current location of the second user indicated by the information obtained by the obtainer 2208 in the list to be displayed. The control device and the communicator of the terminal device 40 collaborate and function as the obtainer 2208.

Figure 14:
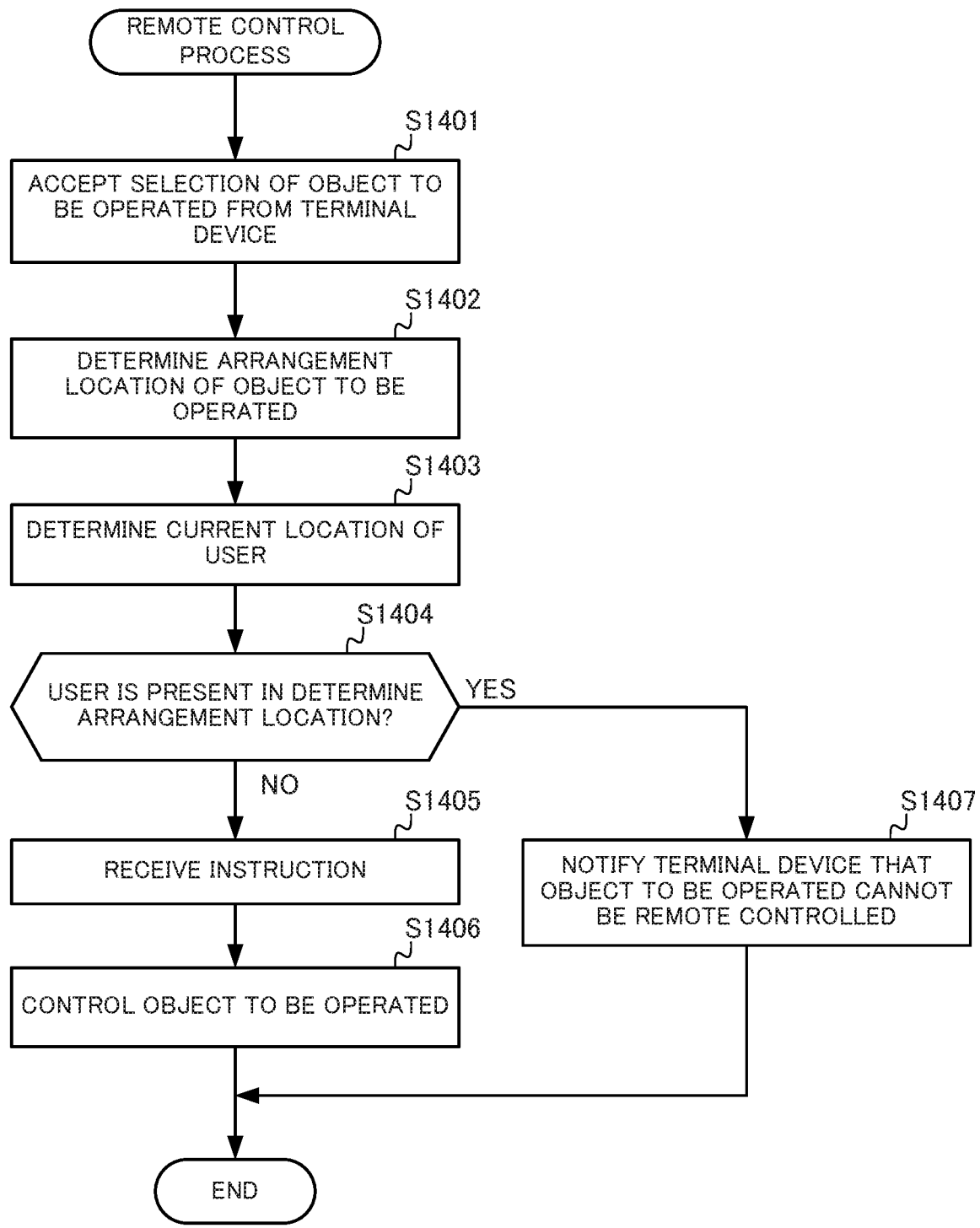
FIG. 14 is a flow chart describing a remote control process.

Next, a remote control process performed by the energy management system 1 is explained using the flow chart shown in FIG. 14. In this embodiment, the appliance and the like in the home are attempted to be remote controlled from the terminal device 40 outside the home.

At first, the control device 305 of the controller 120 accepts from the terminal device 40 a selection of an appliance and the like to be operated (step S1401). In more detail, the terminal device 40 displays the management screen illustrated in FIG. 8 and accepts a selection of the appliance and the like to be remote controlled from the user outside the home. The user selects one of the appliances from among the list, or selects an image indicating one of the appliances from among the layout chart. The terminal device 40 transmits to the controller 120 the data indicating a selection result by the user. The control device 305 of the controller 120 receives the data indicating a selection result by the user from the terminal device 40.

The control device 305 determines the location in which the appliance and the like to be operated, designated in step S1401, are placed (step S1402). For example, the control device 305 identifies the appliance-to-be-operated from among all appliances stored in the appliance-room correspondence table 500, and determines the room corresponding to the identified appliance.

In addition, not only the controller 120 but also the terminal device 40 may pre-store the appliance-room correspondence table 500 illustrated in FIG. 5A, and the terminal device 40 may transmit to the controller 120 the identification information corresponding to the appliance-to-be-operated and the like, the controller 120 may receive this identification information, and the controller 120 may determine the location in which the appliance-to-be-operated and the like are placed based on the appliance-room correspondence table 500.

The control device 305 determines a current location of a user registered in the basic information based on the user current location table 700 (step S1403). For example, the control device 305 determines each current location of a father, a mother, a son, and a daughter when four persons, the father, the mother, the son, and the daughter are registered in the basic information.

The control device 305 determines whether any user registered in the basic information is in the arrangement location determined in step S1402 based on a determination result in step S1403 (step S1404).

When the user determines that there is nobody in the arrangement location determined in step S1402, (step S1404; NO), the control device 305 of the controller 120 notifies the terminal device 40 that the appliance-to-be-operated and the like can be remote controlled. The terminal device 40 accepts an instruction of a specific operation from the user and transmits the accepted instruction content to the controller 120. The control device 305 of the controller 120 receives an instruction of a remote operation to the appliance-to-be-operated and the like from the terminal device 40 (step S1405).

The control device 305 of the controller 120 controls the appliance-to-be-operated and the like based on the received instruction (step S1406).

On the other hand, when it is determined that currently one of the user is in the location determined in step S1402 (step S1404; YES), the control device 305 of the controller 120 notifies the terminal device 40 that the appliance-to-be-operated and the like cannot be remote controlled (that the remote control is not accepted and thus refused) (step S1407). The terminal device 40 displays on the display that the object to be operated designated in step S1401 cannot be remote controlled.

In addition, when a user is in the room in which the appliance-to-be-operated and the like are installed, the remote control of the appliance and the like by the terminal device 40 is not accepted. However, the user in the room can directly operate the appliance and the like.

According to this embodiment, convenience of remote control can be maintained and users in the home can use the energy management system 1 comfortably by limiting remote operations according to the users' presence/absence in the home. An occurrence of confusion due to the remote operation against the will of the user in the home and an instruction of an erroneous operation can be prevented.

In step S1403, the control device 305 may determine whether a record, in which an installation location of the appliance-to-be-operated is associated with the user, is in the user current location table 700. When there is a record in which an installation location of the appliance-to-be-operated is associated with the user, in other words, when somebody is in the location in which the appliance-to-be-operated is installed (step S1404; YES), the control device 305 may notify the terminal device 40 that the control device 305 cannot remote control the appliance-to-be-operated and the like (step S1407), and when nobody is in the location in which is installed (step S1404; NO), the control device 305 may notify the terminal device 40 that the control device 305 can remote control the appliance-to-be-operated and the like.

In this embodiment, we assume a scene in which a user outside the home remotely operates using the terminal device 40. The present disclosure can be applied to a case in which a user in a room in a home remotely operates an appliance and the like in a different room. For example, in a scene in which three family members, of a father, a mother and a child living in a home having a floor layout illustrated in FIG. 8, are relaxing in the living room, any one of the father, the mother and/or the child can remotely operate to turn off an air-conditioner in the children's room while the father, the mother and the child are in the living room, when the air-conditioner is forgotten to set to be turned off. On the other hand, in a scene in which the child is in the children's room and is using an air-conditioner and the father and the mother are in the living room, the father and mother cannot remotely and freely operate the air-conditioner of the children's room in which the child is. The child in the children's room can operate the air-conditioner of the children's room directly. In this way, while convenience of a remote operation can be maintained, an occurrence of confusion and an operation against the will of the user can be prevented.

In this embodiment, the controller 120 is designed such that, when a remote control operation from the terminal device 40 is requested, an appliance-to-be-operated cannot be remote controlled when somebody is in the location in which the appliance-to-be-operated is installed. However, the controller 120 may be designed such that, when there is a specific user, not "somebody", the appliance-to-be-operated cannot be remote controlled.

For example, when the control device 305 of the controller 120 determines an appliance-to-be-operated, the control device 305 of the controller 120 determines the location in which the appliance is installed based on the appliance-room correspondence table 500, and determines the user corresponding to the appliance based on the room-user correspondence table 600. Furthermore, the control device 305 determines whether the determined user is in the determined location based on the user current location table 700. The control device 305 refuses the remote control operation when the control device 305 determines that the determined user is in the determined location, and the control device 305 permits the remote control operation when the control device 305 determines that the determined user is not in the determined location. This enables a finer granularity in the remote control process.

When the control device 305 of the controller 120 determines an appliance-to-be-operated, the control device 305 of the controller 120 determines the location in which the appliance is installed based on the appliance-room correspondence table 500, and determines whether a predetermined user (a person in charge) is in the determined location based on the user current location table 700. The control device 305 refuses the remote control operation when the control device 305 determines that the person in charge is in the determined location, and the control device 305 permits the remote control operation when the control device 305 determines that the person in charge is not in the determined location. In addition, the user can freely set a person in charge.

Embodiment 2

Next, Embodiment 2 is explained. In this embodiment, users can improve communication by referencing the management screen illustrated in FIG. 8.

Figure 15:
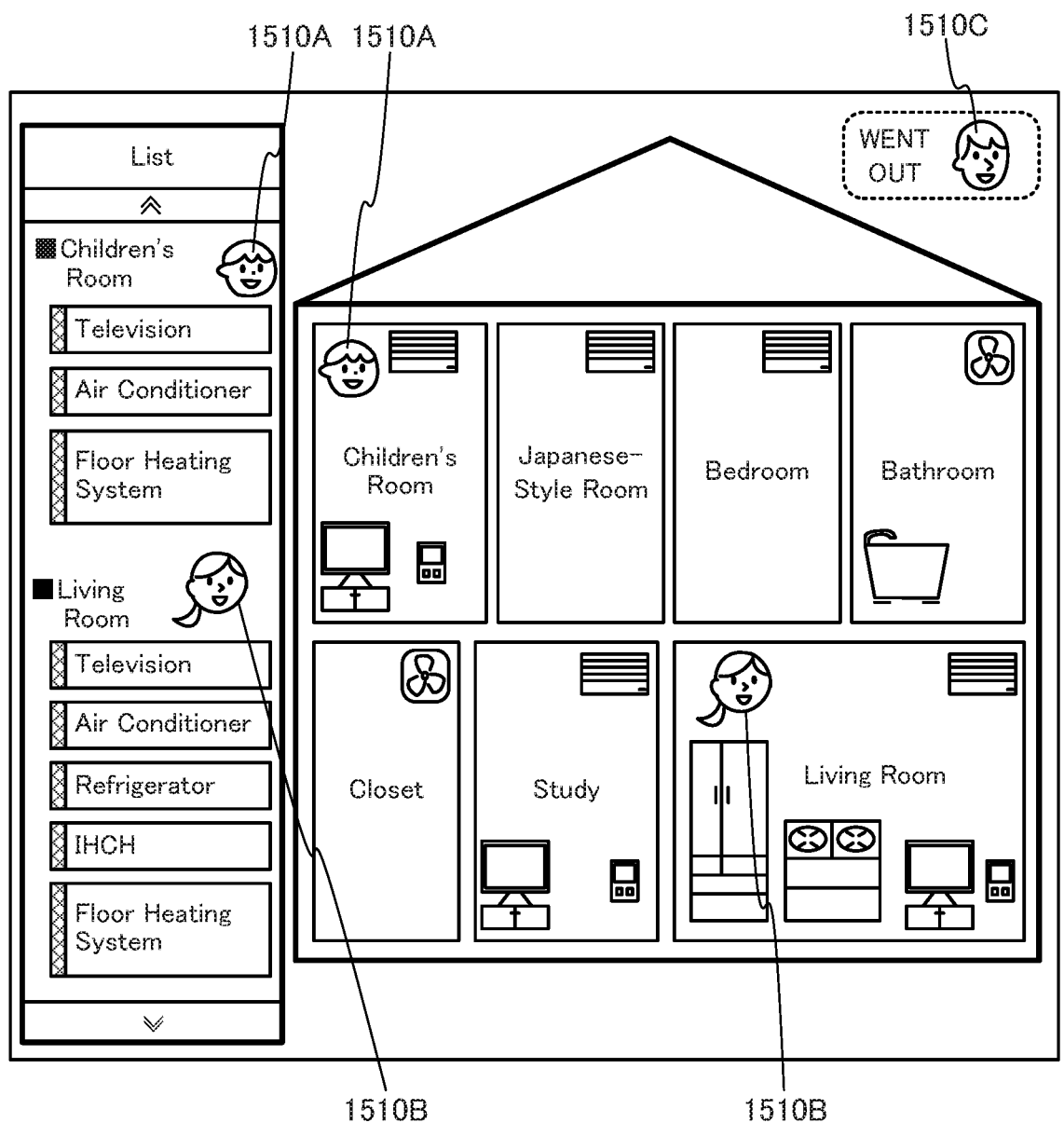
FIG. 15 is a schematic diagram illustrating a configuration example of a management screen.

FIG. 15 illustrates an example of a management screen displayed on the terminal device 40 that a user outside the home uses. When a user (for example, the father) outside the home accesses the controller 120 using the terminal device 40, the controller 120 transmits data indicating locations in which each user (for example, the father, the mother, the child) is currently in, in addition to a list of controllable appliances and the like and a layout chart, to the terminal device 40. The terminal device 40 receives the data indicating the current locations of each user and displays the management screen of FIG. 15 on a display of the terminal device 40. The user (the father) of the terminal device 40 can grasp at a glance that a child is in the children's room by an icon 1510A indicating the child and can grasp at a glance that the mother is in the living room by an icon 1510B indicating the mother. In addition, an icon 1510C indicating that a user is out is placed in the predetermined location corresponding to "user is out".

As mentioned above, the user of the terminal device 40 can remote control a desired appliance and the like by choosing a button corresponding to the appliance and the like in the list or an image illustrating an appliance and the like placed in the layout chart. The appliances and the like in a room in which another user is cannot be remote controlled. However, even if the user of the terminal device 40 understands that somebody is in the room in which the appliance-to-be-operated and the like are installed, the user of the terminal device 40 sometimes cares whether the appliance and the like work normally or whether the appliance and the like continues to run for a long time, and there is a case in which the user of the terminal device 40 wants to contact another user in the room. Therefore, in this embodiment, the user of the terminal device 40 can contact another user via a management screen even when the user of the terminal device 40 cannot remote control the appliance and the like.

Figure 16:
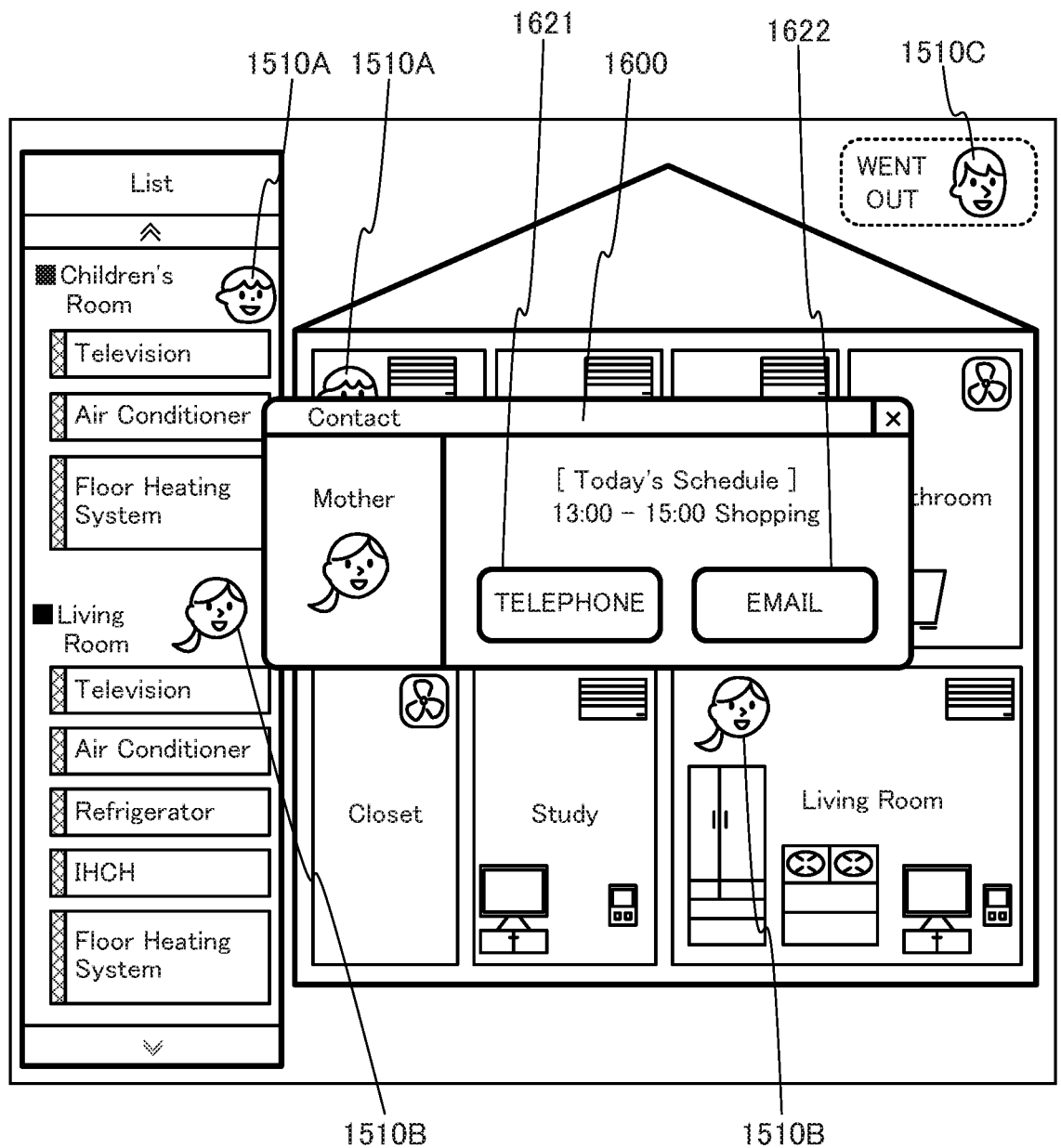
FIG. 16 is a schematic diagram illustrating a dialog box including a button accepting a telephone call instruction and a button for sending instruction of an email.

Specifically, when an icon 1510 indicating a user, in addition to the user of the terminal device 40, is selected, the terminal device 40 accesses the controller 120, obtains data such as a registered schedule or memo of the selected user from the controller 120, as illustrated in FIG. 16, displays the schedule or the memo of the selected user, and displays a dialog box 1600 including a button 1621 accepting an instruction to provide a telephone call and/or a button 1622 accepting an instruction to send an email.

When the button 1621 is pressed, the communicator of the terminal device 40 places a telephone call to the telephone number associated with the selected user. In the case of an example illustrated in FIG. 16, the terminal device 40 places a telephone call to the telephone number (home telephone number) pre-associated with the mother.

When the button 1622 is pressed, the display device of the terminal device 40 displays an editing screen (not shown) of an email for sending to an email address pre-associated with the selected user. The inputter of the terminal device 40 accepts an edited text and title of the email from the user, and the transmitter of the terminal device 40 sends an email to an email address corresponding to the selected user. In the case of the example illustrated in FIG. 16, the terminal device 40 sends an email to an email address pre-associated with the mother.

Figure 17:
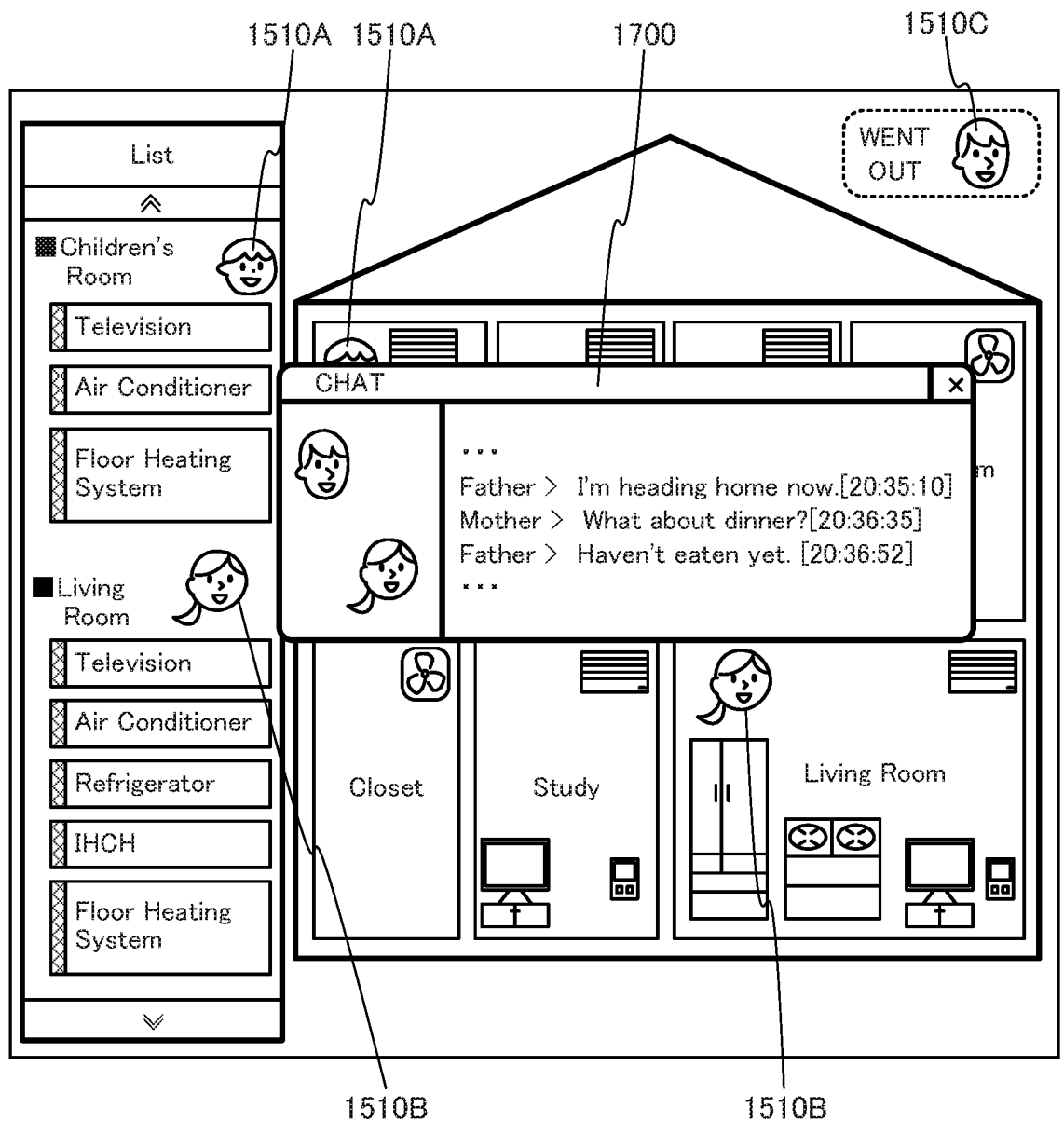
FIG. 17 is a schematic diagram illustrating a chat screen.

The terminal device 40 may be set such that users can contact one another using a telephone, an email and other communication means. For example, as illustrated in FIG. 17, a conversation between a user outside the home and a user in a home using text (so-called chat) may be performed on a chat screen 1700. Of course a chat can be performed between users in the home. In addition, a chat may be performed between users outside the home via the energy management system 1.

The controller 120 plays a role of a chat server in a chat. For example, when a first user using a first terminal device 40 chats with a second user using a second terminal device 40, the controller 120 receives a message for the second terminal device 40 from the first terminal device 40 and transmits the message to the second terminal device 40. Similarly, the controller 120 receives a message for the first terminal device 40 from the second terminal device 40 and transmits the message to the first terminal device 40.

In addition, writing a message onto an electronic bulletin board, reading a message from an electronic bulletin board, writing a message into an external Short message submission system, reading a message from a Short message submission system, a Submission to a Social Networking Service (SNS), and reading a Submission from the SNS, may be set to be performed.

According to this embodiment, users' convenience is increased and, furthermore, effects of increasing interests in energy saving is expected by coordinating the energy management system 1 with communication means such as a telephone, an email and a chat.

Embodiment 3

Next, Embodiment 3 is explained. In this embodiment, the energy management system 1 can appropriately change display styles of a management screen.

Figure 18:
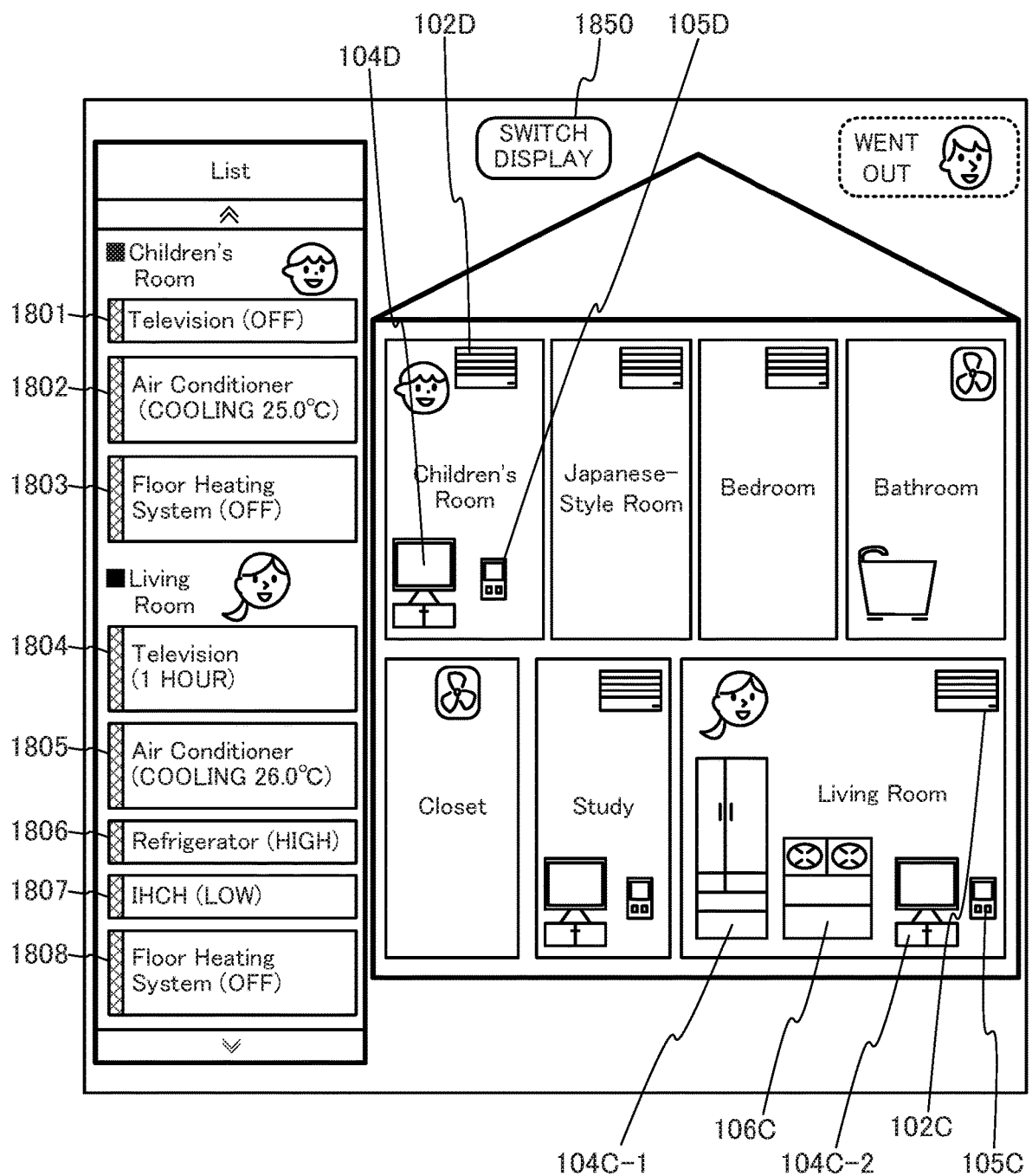
FIG. 18 is a schematic diagram illustrating a configuration example of a management screen.

FIG. 18 illustrates a management screen of the energy management system 1. Information indicating current states of each appliance is displayed on buttons 1801 to 1808 corresponding to each appliance and the like in the list of appliances and the like on the management screen.

For example, in addition to a name of an appliance (TV), information (on/off) indicating whether broadcast is being displayed, and a length of continuous use time of the TV, are displayed on the button 1801 that corresponds to the electrical household appliance 104D in the children's room. In addition to a name of an appliance (air-conditioner), information indicating whether the air-conditioner is in operation and information indicating an operation mode (cooling/heating and the like) and a setting temperature when the air-conditioner is in operation, are displayed on the button 1802 that corresponds to the air-conditioner 102D. In addition to a name of an appliance (floor heater), information indicating whether the floor heater is in operation and information indicating a setting temperature, strength/weakness and the like when the floor heater is in operation, are displayed on the button 1803 that corresponds to the floor heating system 105D.

For example, in addition to a name of an appliance (TV), information (on/off) indicating whether broadcast is being displayed, a length of continuous use time of the TV and the like, are displayed on the button 1804 that corresponds to the electrical household appliance 104C-2 in the living room. In addition to a name of an appliance (air-conditioner), information indicating whether the air-conditioner is in operation and information indicating an operation mode (cooling/heating and the like) and a setting temperature when the air-conditioner is in operation, are displayed on the button 1805 that corresponds to the air-conditioner 102C. In addition to a name of an appliance (refrigerator), information indicating cooling strength, a setting temperature, and the like are displayed on the button 1806 that corresponds to the electrical household appliance 104C-1. In addition to a name of an appliance (IHCH), information indicating whether the IH cooking heater is in operation and information indicating heating strength, a setting temperature, and the like when the IH cooking heater is in operation, are displayed on the button 1807 that corresponds to the IH cooking heater 106C. In addition to a name of an appliance (floor heater), information indicating whether the floor heater is in operation and information indicating a setting temperature, strength/weakness and the like when the floor heater is in operation, are displayed on the button 1808 that corresponds to the floor heating system 105C.

Similarly, information, indicating the current state of the appliance and the like installed in a room in addition to the children's room and the living room, is displayed on the button corresponding to the appliance and the like.

When the buttons 1801 to 1808 are operated by the user, the terminal device 40 notifies the controller 120 that the terminal device 40 provides an instruction to the operated button from a remote location. The controller 120 determines the current state of the designated appliance and the like, and transmits the current state to the terminal device 40. The terminal device 40 obtains and displays a current state from the controller 120, and displays the dialog box 900, illustrated in FIG. 9, accepting a remote operation when the remote operation is possible. The terminal device 40 displays the dialog box 1300 illustrated in FIG. 13 indicating that the designated appliance and the like cannot be remotely operated when the remote operation is impossible. The remote control process of a case in which each button 1801 to 1808 are operated is the same as what is explained in Embodiment 1.

The specific content of the information indicating the current state is not limited to the above-mentioned content and any content can be used. For example, the terminal device 40 may obtain from the controller 120 to display an operation schedule, the last date and time when a direct operation is instructed, the last date and time when the appliance and the like are remotely operated, a name of the last user who remotely operated the appliance, and the like.

Figure 19:
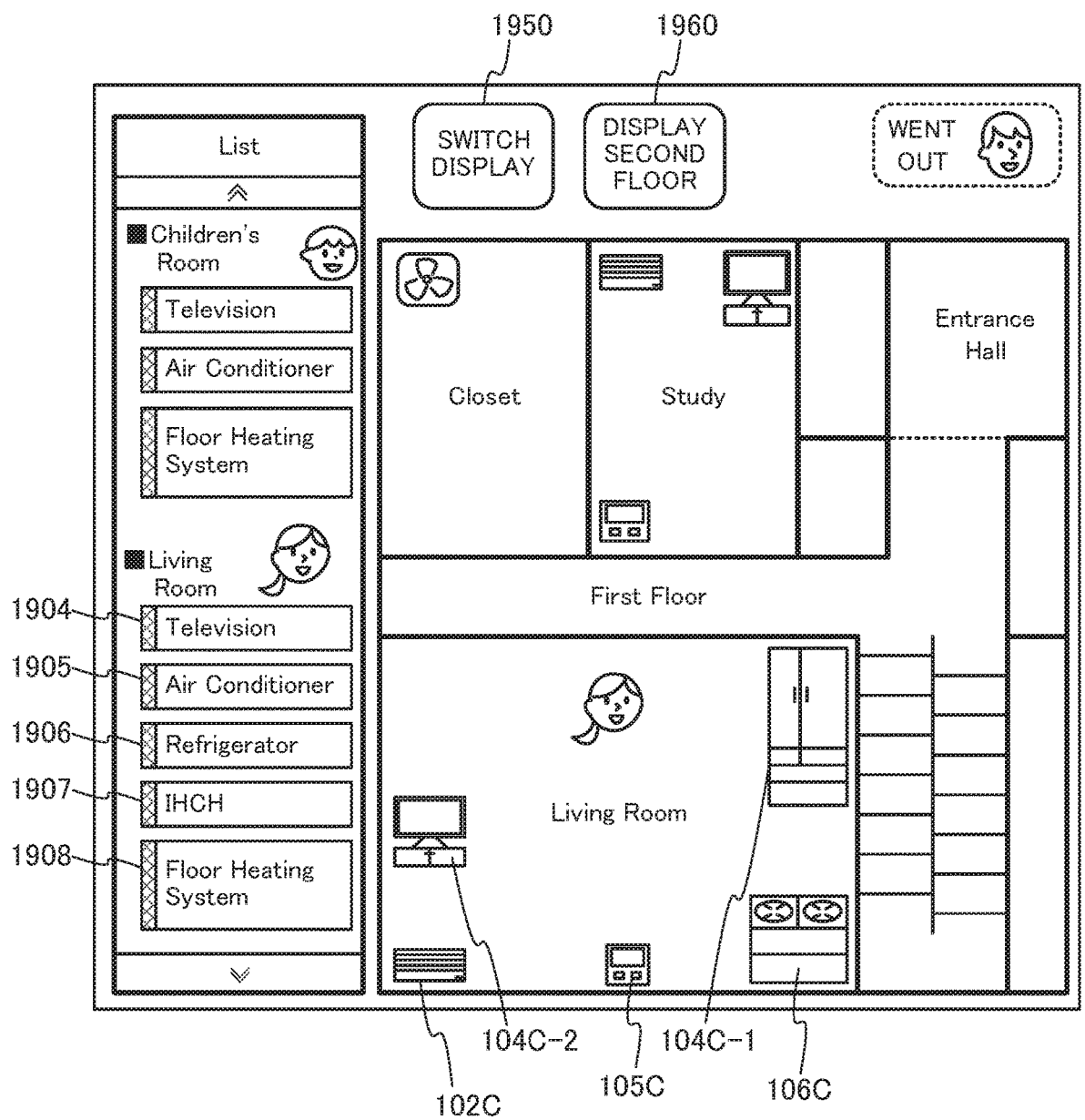
FIG. 19 is a schematic diagram illustrating a configuration example of a management screen in which a layout is expressed in a cross-section view.

When a switch display button 1850 is operated, the terminal device 40 changes a management screen to another display mode. FIG. 19 illustrates an example of a management screen in another display mode after the mode is switched. FIG. 19 schematically illustrates a plan view of the first floor of the home.

In FIG. 19, similar to FIG. 18, each appliance and the like are associated with buttons 1901 to 1908. The button 1904 is associated with the electrical household appliance 104C-2 in the living room on the first floor of the home. The button 1905 is associated with the air conditioner 102C of the living room. The button 1906 is associated with the electrical household appliance 104C-1. The button 1907 is associated with the IH cooking heater 106C. The button 1908 is associated with the floor heating system 105C. Similarly, the appliances and the like installed in a room, other than the living room, are associated with corresponding buttons. As the children's room in the list is on the second floor, an image illustrating the appliance and the like in the children's room is not displayed in the cross sectional view of the first floor.

When the button 1960 for switching a floor number is operated, the terminal device 40 switches to the cross-section view of the second floor while the first floor of the home is displayed. When the second floor of the home is displayed, the terminal device 40 switches to the plan view of the first floor. When the floor number is X (X is an integer more than or equal to 2), the terminal device 40 sequentially switches to, the plan view of the first floor, plan view of the second floor, plan view of the X−1st floor and plan view of the Xth floor, every time the button 1960 is pressed. When the button 1960 is operated while the plan view of the Xth floor is displayed, the display of the plan view of the first floor is displayed again. The above-mentioned floor plans are sequentially displayed afterwards. However, the terminal device 40 may display a button to switch to the plan view of the floor above the current floor, may display a button to switch to the plan view of the floor below the current floor, and may accept an input from the user.

When a plan view of a certain floor is displayed and the user operates a button corresponding to the appliance and the like installed in another floor in the list, the terminal device 40 may switch to the plan view of the floor on which the appliance corresponding to the operated button is installed. In this case the user may not need to operate the button 1960.

Figure 20:
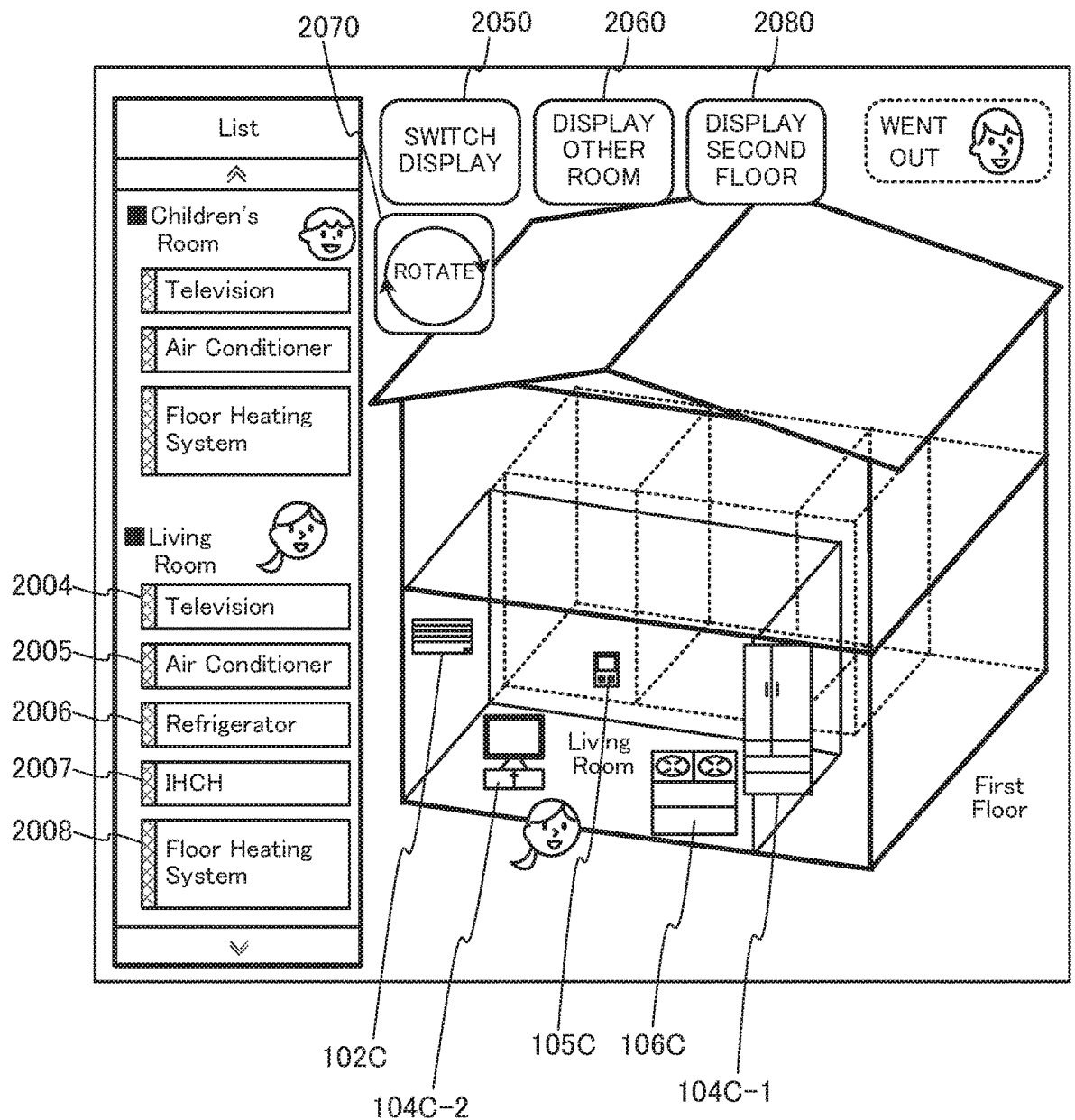
FIG. 20 is a schematic diagram illustrating a configuration example of a management screen in which a layout is expressed in a diagrammatic perspective view.

When a switch display button 1950 is operated, the terminal device 40 switches the management screen to another display mode. FIG. 20 illustrates an example of a management screen in another display mode after the mode is switched. FIG. 20 schematically illustrates a diagrammatic perspective view.

In FIG. 20, similar to FIG. 18 and FIG. 19, each appliance and the like are associated with buttons 2001 to 2008. The button 2004 is associated with the electrical household appliance 104C-2 in the living room of the first floor of the home. The button 2005 is associated with the air conditioner 102C of the living room. The button 2006 is associated with the electrical household appliance 104C-1. The button 2007 is associated with the IH cooking heater 106C. The button 2008 is associated with the floor heating system 105C. Similarly, the appliances and the like installed in a room in addition to the living room are associated with corresponding buttons.

When the switch button 2060 to display another room is pressed, the terminal device 40 displays an image illustrating the appliance and the like installed in another room in the home. When there are X rooms, the terminal device 40 sequentially switches to, a first room, a second room, a (X−1)th room, and Xth room. When the button 2060 is operated while the Xth room is displayed, the first floor is displayed again. The above-mentioned rooms are sequentially displayed afterwards. However, the terminal device 40 may display a button that directly designates the room and may accept an input from the user.

When the button 2080 switching a floor number is operated, the terminal device 40 switches to the cross-section view of the second floor when the first floor of the home is displayed. When the second floor of the home is displayed, the terminal device 40 switches to the plan view of the first floor. The specification of the button 2080 is the same as the specification of the above-mentioned button 1960.

When a room to be displayed is switched, the terminal device 40 rotates the diagrammatic perspective view such that the room will be closest to a viewer as seen from the virtual viewpoint.

When the button 2070 changing an angle is operated, the terminal device 40 rotates the diagrammatic perspective view while the button is operated, or typically pressed. Or, with a single operation of the button 2070, the terminal device 40 may rotate the diagrammatic perspective view by a predetermined angle. Rotation direction and the rotation speed are arbitrary.

In addition, on management screens shown in FIG. 18, FIG. 19, and FIG. 20, similar to the above-mentioned embodiment, when the user operates a button in the list of appliances and the like, the user can remotely operate the appliance corresponding to the operated button. When the user selects an image illustrating the appliance and the like in the layout chart, the user can remotely operate the selected appliance. The remote control process in this embodiment is the same as what is explained in Embodiment 1.

In this embodiment, the terminal device 40 alternatively switches and displays three management screens: the management screen illustrated in FIG. 18, the management screen using the cross-section view illustrated in FIG. 19 and the management screen using the diagrammatic perspective view illustrated in FIG. 20. However, display modes of management screens are not limited to only these three. In addition, the terminal device 40 may display management screens in only two display modes, or may be able to switch to more than three display modes.

Switching of management screens may be performed not by a press operation of a button but by an inclination operation, a swinging operation and/or the like of the terminal device 40 by the user. The terminal device 40 may further include a detector having an acceleration sensor or a gyro sensor, and may switch management screens based on a change of the orientation of the terminal device 40.

In addition, when the terminal device 40 detects a change of the orientation of the terminal device 40 while the management screen with the diagrammatic perspective view is displayed, the viewpoint of the diagrammatic perspective view may be changed depending on the change of the orientation of the terminal device 40. For example, when the terminal device 40 inclines in the left direction of the display, the terminal device 40 may rotate the diagrammatic perspective view counterclockwise, and may rotate the diagrammatic perspective view clockwise, when the terminal device 40 inclines in the right direction of the display.

According to this embodiment, management screens of the energy management system 1 can be varied and switched depending on the preference of the user. Therefore, the convenience of the user is increased, and, besides, furthermore, effects of increasing interests in energy saving is expected. In addition, there are effects such as the user being able to easily look for an appliance and/or the like that the user wants to remotely operate, and being able to easily select an image illustrating the appliance and the like when there are many operable appliances and the like or a layout of the home is complicated.

The present disclosure is not limited to the above-mentioned embodiment, and various forms and applications are possible. In addition, each component of the above-mentioned embodiment can be freely combined.

In each of the above-mentioned embodiments, the terminal device 40 or the controller 120 displays an image illustrating appliances and the like in the layout chart of the management screens. Besides this, a message, an image or the like indicating the phenomenon may be displayed when a specific phenomenon such as a communication error, a failure, a long-time operation or the like occurs.

Figure 21:
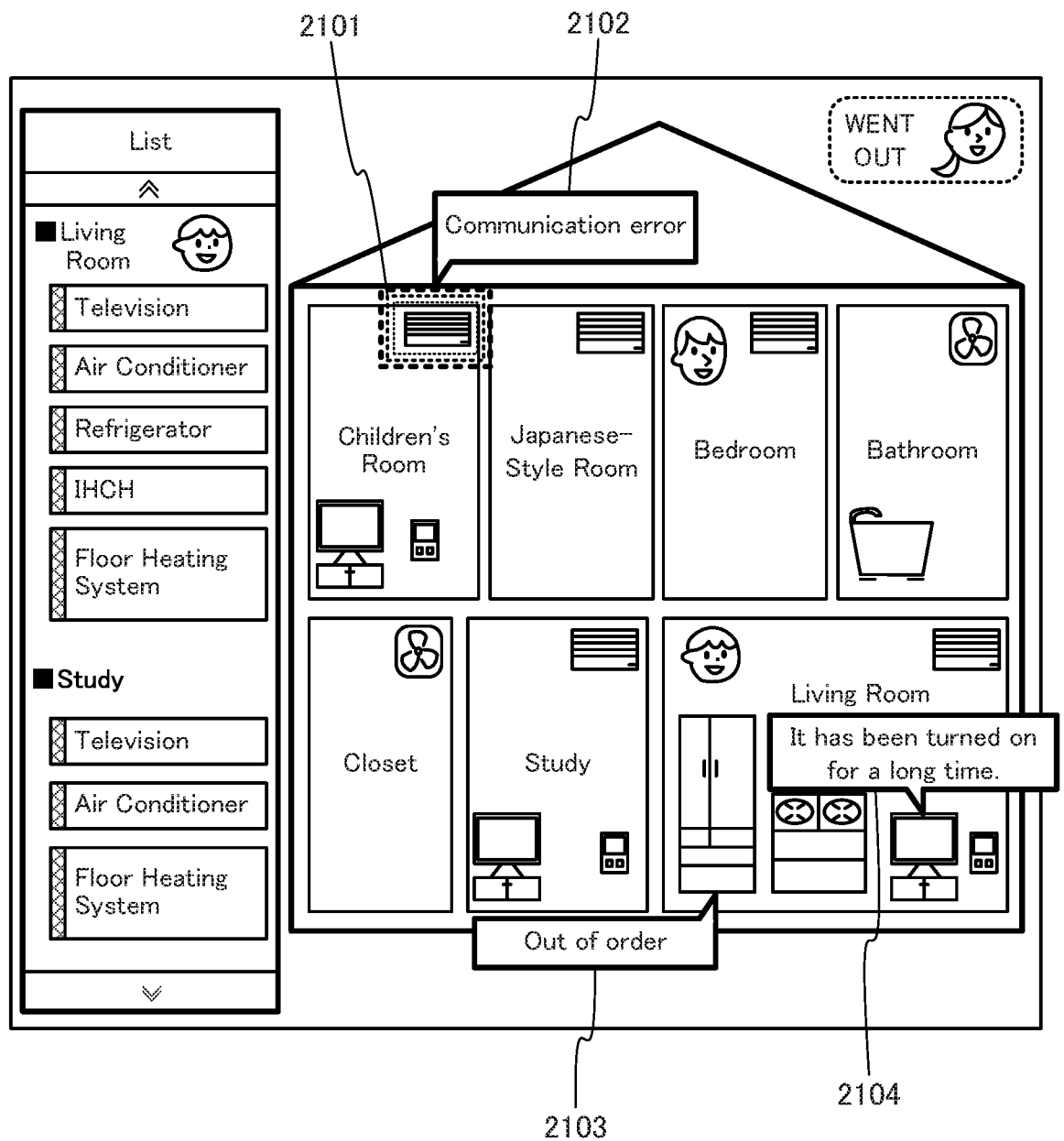
FIG. 21 is a schematic diagram illustrating a configuration example of a management screen.

FIG. 21 illustrates another example of a management screen. When the controller 120 notifies that a specific phenomenon has occurred in a certain appliance, the terminal device 40 may highlight the image indicating the appliance. For example, when the terminal device 40 is notified from the controller 120 that a specific phenomenon has occurred, the terminal device 40 displays an image surrounded by a frame 2101 to be easily noticed indicating that the specific phenomenon has occurred. In addition, when the controller 120 detects that a specific phenomenon has occurred in a certain appliance, the controller 120 may highlight the image indicating the appliance.

When the terminal device 40 is notified from the controller 120 that a communication error has occurred in a certain appliance in a room in the home network 10, the terminal device 40 may display a message 2102 that a communication error has occurred in the appliance with an image indicating the appliance, the message 2102 being related with the image. In addition, when the controller 120 detects that the communication error has occurred in the certain appliance in the room in the home network 10, the terminal device 40 may display the message 2102 that a communication error has occurred in the appliance with the image indicating the appliance on the display device 302, the message 2102 being related with the image.

When the terminal device 40 is notified from the controller 120 that some or all functions of a certain appliance are out of order, the terminal device 40 may display a message 2103 that the appliance is out of order with an image indicating the appliance, the message 2103 being related with the image. In addition, when the controller 120 detects that some or all functions of the appliance are out of order, the terminal device 40 may display the message 2103 that the appliance is out of order with the image indicating the appliance on the display device 302, the message 2103 being related with the image.

When the terminal device 40 is notified from the controller 120 that a continuous operation time of a certain appliance has passed more than a predetermined time, the terminal device 40 may display a message 2104, that the appliance has been operating for a long time, with an image indicating the appliance, the message 2104 being related with the image. In addition, when the controller 120 detects that the continuous operation time of the certain appliance has passed more than the predetermined time, the terminal device 40 may display the message 2104, that the appliance has been operating for a long time, with the image indicating the appliance, the message 2104 being related with the image. The length of the predetermined time may be determined by the controller 120, or a user of the controller 120 or a user of the terminal device 40 may freely set the length of the predetermined time.

The terminal device 40 and the controller 120, instead of displaying each message 2102, 2103, and/or 2104 that a specific phenomenon has occurred, or, in addition to displaying each message 2102, 2103, and/or 2104, may display an icon and/or a mark indicating that a specific phenomenon has occurred.

The terminal device 40 and the controller 120 may display the image indicating the appliance in different colors for every occurred phenomenon. For example, the terminal device 40 and the controller 120 may express differences of the phenomena in different colors in such a way that red for a trouble of the appliance is expressed in red color, a communication error in blue color, or warning against a long operation time in yellow color or the like.

When a specific phenomenon has occurred, instead of displaying the message 2102, 2103, and/or 2104 in a layout chart, the terminal device 40 and the controller 120 may pop up a message indicating that a specific phenomenon has occurred. This increases effects of calling for attention of the user.

The terminal device 40 and the controller 120 may display a state of an appliance managed by the energy management system 1 of another home. For example, in a situation in which parents and a child live in different homes, an energy management system 1 of the child's home and another energy management system 1 of the parents' home far away from the child's home may be cooperated, and the parents' home may be "watched" by the child's home.

In this case, the controller of the first energy management system 1 (watching-over side) may be able to communicate with the controller of the second energy management system (being watched-over side) regularly, transmit and receive data indicating states of appliances and the like, and the user may be allowed to read the state of the appliance of the second energy management system via the first energy management system 1.

The watcher side first energy management system 1 may be allowed to read all the states of the appliance of the second energy management system on the being watched side. Readable content may be limited, or only simplified information may be allowed to read. For example, the watcher (for example, a child) may not be allowed to view the room in which a person being watched over (for example, a parent) is in, but may be allowed to view whether the person is in the home or outside the home.

In each of the above-mentioned examples, the controller 120 and the terminal device 40 display both the list of appliances and the like and the layout chart in the management screen. Alternatively, the controller 120 and the terminal device 40 may display either one of the list or the layout chart alone.

A program to operate a computer as a whole or a part of the energy management system 1 may be stored in a computer readable recording medium such as a memory card, CD-ROM, DVD and Magneto Optical disk (MO) and distributed, and the program may be installed into a different computer, and then may be caused to operate as above-mentioned means, or, the above-mentioned process may be executed.

Furthermore, the program may be stored into a disks device and the like held by a server device on the Internet, for example, superimposed on carrier waves, and, the program may be downloaded or the like into a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

As described above, each the above-mentioned embodiments can provide an energy management system, a controller, a remote control method and a program that maintain the convenience of the remote control operation without affecting user comfort.

This application claims the benefit of Japanese Patent Application No. 2013-146443, the entire disclosure of which is incorporated by reference herein.

REFERENCE SIGNS LIST

1 Energy management system
10 Inside-home network
20 Outside-home network
30 Server
40 Terminal device
50 Communication network
101 Independent switching board
102 Air conditioner
103 Ventilation system
104 Electrical household appliance
105 Floor heating system
106 IH cooking heater
107 Hot water supply system
108 Power generation system
109 Electricity storage system
110 Electric vehicle
120 Controller
301 Inputter
302 Display device
303 Memory device
304 Communicator
305 Control device
400 Layout definition table
500 Appliance-room correspondence table
600 Room-user correspondence table
700 User current location table
801 Icon
900 Dialog box
1200 Dialog box
1300 Dialog box
2201 Acceptor
2202 Transmitter
2203 Receiver
2204 Determiner
2205 Appliance controller
2206 Communicator
2207 Display device
2208 Obtainer

The invention claimed is:

1. An appliance control system comprising a home controller configured to manage an appliance installed in each room of a plurality of rooms in a home, and a terminal device configured to communicate with the home controller, wherein:

the terminal device comprises:
an acceptor configured to accept an instruction for remotely controlling the appliance from a first user, and
a transmitter configured to transmit the instruction accepted by the acceptor to the home controller; and the home controller comprises:
a receiver configured to receive the instruction from the terminal device,
an appliance-room correspondence table that stores a correspondence between each room of the plurality of rooms and an appliance installed in each room,
a room-user correspondence table that stores a correspondence between each room of the plurality of rooms and a main user of each room,
a room determiner configured to determine a room in which an appliance to be given the instruction is installed, with reference to the appliance-room correspondence table,
a determiner configured to determine whether a second user, who is a main user of the room determined by the room determiner, is present in the room determined by the room determiner, with reference to the room-user correspondence table, and
an appliance controller configured to control the appliance based on the instruction when the determiner determines that the second user is not present in the room determined by the room determiner, and configured to not control the appliance based on the instruction when the determiner determines that the second user is present in the room determined by the room determiner.

2. The appliance control system according to claim 1, wherein
the home controller further comprises a notifier configured to notify to the terminal device that the appliance cannot be remote controlled based on the instruction and that the second user is present in the room, when the determiner determines that the second user is present in the room in which the appliance-to-be-instructed is installed.

3. The appliance control system according to claim 1, wherein:
the terminal device further comprises a display device configured to display a layout chart to illustrate an arrangement of each room and an appliance installed in each room in the home;
the acceptor is further configured to accept an operation that selects any one of the appliances from the layout chart;
the determiner is configured to determine a current location of the second user;

the terminal device further comprises an obtainer configured to obtain information indicating the determined current location of the second user from the home controller; and the display device is configured to display an image representing the second user in a location that matches with the determined current location of the second user in the layout chart.

4. The appliance control system according to claim 1, wherein the terminal device further comprises a display device configured to display a list of appliances installed in the home and a layout chart illustrating an arrangement of each room and the appliance installed in each room in the home; and the display device is further configured to highlight, when the instruction is accepted, information indicating the appliance-to-be-instructed in the list, and the appliance-to-be-instructed indicated in the layout chart.

5. The appliance control system according to claim 1, wherein the terminal device further comprises an obtainer configured to obtain information indicating an operating condition of the appliance installed in each room in the home from the home controller; and the display device is further configured to display, when a specific phenomenon occurs in the appliance installed in each room in the home, an image or a message indicating the phenomenon.

6. The appliance control system according to claim 1, wherein the terminal device further comprises an obtainer configured to obtain a message from the second user; and the display device is further configured to display, when the image representing the second user is selected by the first user, the message obtained by the obtainer.

7. The appliance control system according to claim 1, wherein the acceptor is further configured to accept an instruction to place a telephone call or to send an email to the second user; and the terminal device further comprises a communicator to place a telephone call based on the instruction to place a telephone call to the second user or to send an email based on the instruction to send an email to the second user.

8. The appliance control system according to claim 1, wherein:

the terminal device further comprises a display device configured to display a layout chart to illustrate an arrangement of each room and an appliance installed in each room in the home;

the acceptor is further configured to accept an instruction to designate the layout chart to be displayed whether in a first mode or in a second mode that is different from the first mode; and the display device is further configured to display the layout chart either in the first mode or in the second mode based on the instruction accepted by the acceptor.

9. The appliance control system according to claim 8, wherein the terminal device further comprises a detector configured to detect an orientation of the terminal device; and the display device is further configured to display the layout chart in the first mode or in the second mode based on the orientation detected by the detector.

10. The appliance control system according to claim 1, wherein:

the terminal device further comprises a display device configured to display a list of appliances installed in the home;

the acceptor is configured to accept an operation that selects any of the appliances from the list;

the determiner is configured to determine a current location of the second user;

the terminal device further comprises an obtainer configured to obtain information indicating the determined current location of the second user from the home controller;

the list includes an area indicating an installation location of the appliance; and the display device is configured to display an image representing the second user in an area in the list, the area indicating the installation location that matches with the determined current location of the second user.

11. The appliance control system according to claim 1, further comprising a display device configured to display a list of appliances installed in each room in the home, wherein information indicating a current state of the appliance is displayed in the list.

12. A home controller comprising:

a receiver configured to receive an instruction for remotely controlling an appliance from a terminal device used by a first user, the appliance being installed in each room in a home;

an appliance-room correspondence table that stores a correspondence between each room in the home and an appliance installed in each room;

a room-user correspondence table that stores a correspondence between each room in the home and a main user of each room;

a room determiner configured to determine, with reference to the appliance-room correspondence table, a room in the home in which an appliance-to-be-instructed is installed;

a user determiner configured to determine, with reference to the room-user correspondence table, whether a second user, who is a main user of the room determined by the room determiner, is present in the room determined by the room determiner; and an appliance controller configured to control the appliance based on the instruction by the first user when the user determiner determines that the second user is not present in the room determined by the room determiner, and configured to not control the appliance based on the instruction by the first user when the user determiner determines that the second user is present in the room determined by the room determiner.

13. A remote control method comprising:

receiving an instruction for remotely controlling an appliance from a terminal device used by a first user, the appliance being installed in each room of a plurality of rooms in a home;

determining a room in which an appliance to be given the instruction is installed, with reference to an appliance-room correspondence table that stores a correspondence between each room of the plurality of rooms in the home and an appliance installed in each room;

determining whether a second user, who is a main user of the room in which it is determined that the appliance to be given the instruction is installed, is present in the room in which it is determined that the appliance to be given the instruction is installed, with reference to a room-user correspondence table that stores a correspondence between each room of the plurality of rooms in the home and a main user of each room; and controlling the appliance based on the instruction when a determination is made that the second user is not present in the room in which it is determined that the appliance to be given the instruction is installed, and not controlling the appliance based on the instruction when a determination is made that the second user is present in the room in which it is determined that the appliance to be given the instruction is installed.

14. A non-transitory computer-readable recording medium storing a program, the program causing a computer to function as:

a receiver configured to receive an instruction for remotely controlling an appliance from a terminal device used by a first user, the appliance being installed in each room of a plurality of rooms in a home;

an appliance-room correspondence table that stores a correspondence between each room of the plurality of rooms in the home and an appliance installed in each room;

a room-user correspondence table that stores a correspondence between each room of the plurality of rooms and a main user of each room;

a room determiner configured to determine a room in which an appliance to be given the instruction is installed, with reference to the appliance-room correspondence table;

a determiner configured to determine whether a second user, who is a main user of the room determined by the room determiner, is present in the room determined by the room determiner, with reference to the room-user correspondence table; and an appliance controller configured to control the appliance based on the instruction when the determiner determines that the second user is not present in the room determined by the room determiner, and configured to not control the appliance based on the instruction when the determiner determines that the second user is present in the room determined by the room determiner.

* * * * *